US011292936B2

(12) United States Patent
Nakamizu

(10) Patent No.: US 11,292,936 B2
(45) Date of Patent: Apr. 5, 2022

(54) COATING COMPOSITION

(71) Applicant: KANSAI PAINT CO., LTD., Hyogo (JP)

(72) Inventor: Masato Nakamizu, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 606 days.

(21) Appl. No.: 16/316,105

(22) PCT Filed: Jul. 12, 2017

(86) PCT No.: PCT/JP2017/025448
§ 371 (c)(1),
(2) Date: Jan. 8, 2019

(87) PCT Pub. No.: WO2018/012552
PCT Pub. Date: Jan. 18, 2018

(65) Prior Publication Data
US 2021/0277276 A1    Sep. 9, 2021

(30) Foreign Application Priority Data
Jul. 15, 2016  (JP) .............................. JP2016-140786

(51) Int. Cl.
| *C09D 175/12* | (2006.01) |
| *C09D 7/44* | (2018.01) |
| *C09D 5/04* | (2006.01) |
| *C09D 133/06* | (2006.01) |
| *C08F 220/18* | (2006.01) |
| *C08G 18/40* | (2006.01) |
| *C08G 18/50* | (2006.01) |
| *C08G 18/62* | (2006.01) |
| *C08G 18/64* | (2006.01) |
| *C08G 18/73* | (2006.01) |
| *C08G 18/79* | (2006.01) |
| *C08G 18/80* | (2006.01) |
| *C08G 18/28* | (2006.01) |
| *C09D 7/43* | (2018.01) |
| *C09D 175/04* | (2006.01) |
| *C09D 201/00* | (2006.01) |

(52) U.S. Cl.
CPC ...... *C09D 175/12* (2013.01); *C08F 220/1804* (2020.02); *C08G 18/2865* (2013.01); *C08G 18/4063* (2013.01); *C08G 18/5024* (2013.01); *C08G 18/6229* (2013.01); *C08G 18/6254* (2013.01); *C08G 18/6415* (2013.01); *C08G 18/73* (2013.01); *C08G 18/792* (2013.01); *C08G 18/8061* (2013.01); *C09D 5/04* (2013.01); *C09D 7/43* (2018.01); *C09D 7/44* (2018.01); *C09D 133/066* (2013.01); *C09D 175/04* (2013.01); *C09D 201/00* (2013.01)

(58) Field of Classification Search
CPC ........ C09D 5/04; C09D 7/44; C09D 133/066; C09D 175/12; C09D 7/43; C09D 175/04; C09D 201/00; C08F 220/1804; C09G 18/4063; C09G 18/5024; C09G 18/6229; C09G 18/6254; C09G 18/6415; C09G 18/73; C09G 18/792; C09G 18/8061; C09G 18/2865

See application file for complete search history.

(56) References Cited

U.S. PATENT DOCUMENTS

| 4,851,294 | A | 7/1989 | Buter et al. |
| 4,882,408 | A | 11/1989 | Blum |
| 2004/0158022 | A1 | 8/2004 | Baumgart et al. |
| 2005/0049358 | A1 | 3/2005 | Dai et al. |
| 2006/0276675 | A1 | 12/2006 | Haubennestel et al. |
| 2008/0221249 | A1* | 9/2008 | Dai .................... C08G 18/7831 524/315 |
| 2010/0258762 | A1 | 10/2010 | Isobe et al. |
| 2012/0226075 | A1 | 9/2012 | Leutfeld et al. |
| 2014/0147596 | A1 | 5/2014 | Wegner et al. |

FOREIGN PATENT DOCUMENTS

| CA | 2439786 | * | 3/2004 |
| CN | 102597036 | | 7/2012 |
| CN | 103403052 | | 11/2013 |
| CN | 104497823 | | 4/2015 |
| EP | 2 072 549 | | 6/2009 |
| JP | 61-192774 | | 8/1986 |
| JP | 01-24851 | | 1/1989 |
| JP | 10-251370 | | 9/1998 |
| JP | 11-71441 | | 3/1999 |
| JP | 2001-172360 | | 6/2001 |
| JP | 2005-239780 | | 9/2005 |
| JP | 2008-527126 | | 7/2008 |
| JP | 2011-52213 | | 3/2011 |
| TW | 200922958 | | 6/2009 |
| TW | 201109396 | | 3/2011 |

(Continued)

OTHER PUBLICATIONS

Extended European Search Report dated Feb. 21, 2020 in corresponding European Patent Application No. 17827678.8.
Notice of Reasons for Refusal dated Jan. 21, 2020 in corresponding Japanese Patent Application No. 2018-527643, with English-language translation.
Office Action dated Apr. 15, 2020 in corresponding Chinese Patent Application No. 201780042497.5 with English-translation.
International Search Report dated Aug. 22, 2017 in International (PCT) Application No. PCT/JP2017/025448.

*Primary Examiner* — Patrick D Niland
(74) *Attorney, Agent, or Firm* — Wenderoth, Lind & Ponack, L.L.P.

(57) ABSTRACT

A paint composition comprises (A) a binder component and (B) a rheology control agent, the rheology control agent (B) comprising a reaction product of (b1) a polyisocyanate compound, (b2) a primary monoamine having a number average molecular weight of 300 or less, and (b3) a polyether amine having a number average molecular weight of more than 300 but less than 6000.

10 Claims, No Drawings

(56) References Cited

FOREIGN PATENT DOCUMENTS

| | | |
|---|---|---|
| WO | 2006/075000 | 7/2006 |
| WO | 2007/104623 | 9/2007 |
| WO | 2009/039145 | 3/2009 |
| WO | 2009/072561 | 6/2009 |

* cited by examiner

COATING COMPOSITION

TECHNICAL FIELD

The present invention relates to a paint composition.

BACKGROUND ART

To impart excellent appearance and properties to a substrate, a coating film is conventionally formed on the substrate by applying a paint composition to the substrate to form a wet coating film and curing the wet coating film.

In this regard when the substrate has a vertical plane, there is a problem that the wet coating film on the vertical plane sags, causing poor appearance of the resulting coating film. Thus, research has been conducted on a paint composition containing a rheology control agent with sag control capability.

For example, Patent Literature 1 discloses a thixotropic paint containing a binder and a diurea compound as a sag control agent, wherein the sag control agent is a reaction product of a symmetrical aliphatic or homocyclic diisocyanate and a monoamine or diamine containing at least a primary amino group and an ether group, the sag control agent consisting of solid particles and the paint containing 0.1 to 30 wt % of the sag control agent. Patent Literature 1 discloses that the thixotropic paint is satisfactorily thixotropic at any curing temperature, for instance at ambient temperature or at a temperature in the range of 60 to 260° C. without impairing flowability. However, there is a problem that a coating film formed by using the paint composition may have insufficient transparency, water resistance, and finished appearance.

CITATION LIST

Patent Literature

PTL 1: JPS61-192774A

SUMMARY OF INVENTION

Technical Problem

The present invention has been accomplished in view of the circumstances described above, and an object of the present invention is to provide a paint composition capable of forming a coating film with excellent transparency, water resistance, and finished appearance.

Solution to Problem

The present inventor conducted extensive research to achieve the above object, and found that the object can be achieved by a paint composition that comprises (A) a binder component and (B) a rheology control agent comprising a reaction product of (b1) a polyisocyanate compound, (b2) a primary monoamine having a number average molecular weight of 300 or less, and (b3) a polyether amine having a number average molecular weight of more than 300 but less than 6000.

Specifically, the present invention includes the following embodiments.

Item 1. A paint composition comprising (A) a binder component and (B) a rheology control agent, the rheology control agent (B) comprising a reaction product of (b1) a polyisocyanate compound, (b2) a primary monoamine having a number average molecular weight of 300 or less, and (b3) a polyether amine having a number average molecular weight of more than 300 but less than 6000.

Item 2. The paint composition according to Item 1, wherein the binder component (A) comprises a hydroxy-containing resin (A1) and a crosslinking agent (A2).

Item 3. The paint composition according to Item 2, wherein the crosslinking agent (A2) comprises a polyisocyanate compound.

Item 4. The paint composition according to any one of Items 1 to 3, wherein the primary monoamine having a number average molecular weight of 300 or less (b2) comprises a benzene ring-containing primary monoamine.

Item 5. The paint composition according to any one of Items 1 to 4, wherein the polyether amine having a number average molecular weight of more than 300 but less than 6000 (b3) is a diamine.

Item 6. The paint composition according to any one of Items 1 to 5, wherein the proportions of the polyisocyanate compound (b1), the primary monoamine having a number average molecular weight of 300 or less (b2), and the polyether amine having a number average molecular weight of more than 300 but less than 6000 (b3) in the rheology control agent (B) are such that based on the total amount of the components (b1) to (b3), the amount of the polyisocyanate compound (b1) is within the range of 30 to 60 mass %, the amount of the primary monoamine having a number average molecular weight of 300 or less (b2) is within the range of 35 to 65 mass %, and the amount of the polyether amine having a number average molecular weight of more than 300 but less than 6000 (b3) is within the range of 0.5 to 15 mass %.

Item 7. The paint composition according to any one of Items 1 to 6, wherein the content of the rheology control agent (B) is within the range of 0.1 to 3 parts by mass based on 100 parts by mass of the total solids content of the binder component (A).

Advantageous Effects of Invention

The paint composition of the present invention comprises (A) a binder component and (B) a rheology control agent comprising a reaction product of (b1) a polyisocyanate compound, (b2) a primary monoamine having a number average molecular weight of 300 or less, and (b3) a polyether amine having a number average molecular weight of more than 300 but less than 6000. Accordingly, the present invention achieves the effect of forming a coating film having excellent transparency, water resistance, and finished appearance.

DESCRIPTION OF EMBODIMENTS

The paint composition of the present invention is described below in more detail.

The paint composition of the present invention (hereinafter sometimes simply referred to as "the paint of the present invention") comprises (A) a binder component and (B) a rheology control agent, the rheology control agent (B) comprising a reaction product of (b1) a polyisocyanate compound, (b2) a primary monoamine having a number average molecular weight of 300 or less, and (b3) a polyether amine having a number average molecular weight of more than 300 but less than 6000.

Binder Component (A)

The binder component (A) itself has film-forming properties, and may be either non-crosslinkable or crosslinkable, in particular, preferably crosslinkable. As the binder component (A), a known film-forming resin that has been used as a binder component for paint can be used.

Examples of film-forming resins include acrylic resins, polyester resins, alkyd resins, polyurethane resins, and the like. The film-forming resin preferably contains a crosslinkable functional group, such as hydroxy, carboxy, or epoxy.

In addition to the film-forming resin, a crosslinking agent can also be used as the binder component (A). When a crosslinking agent is used as a part of the binder component (A), a resin (a base resin) that contains a crosslinkable functional group, such as hydroxy, carboxy, or epoxy, and that can form a crosslinked coating film by reaction with the crosslinking agent, can be generally used as the film-forming resin. From the viewpoint of, for example, the water resistance of the resulting coating film, the paint composition of the present invention is preferably a crosslinkable paint containing the base resin described above and a crosslinking agent.

In particular, the paint composition of the present invention preferably contain a hydroxy-containing resin (A1) as at least a part of the base resin, and a crosslinking agent (A2) reactive with the hydroxy-containing resin (A1) as at least a part of the crosslinking agent.

Hydroxy-Containing Resin (A1)

The hydroxy-containing resin (A1) is a resin having at least one hydroxy group per molecule. Various known resins can be used as the hydroxy-containing resin (A1). Examples include hydroxy-containing acrylic resins, hydroxy-containing polyester resins, hydroxy-containing acrylic-modified polyester resins, hydroxy-containing polyether resins, hydroxy-containing polycarbonate resins, hydroxy-containing polyurethane resins, hydroxy-containing epoxy resins, hydroxy-containing alkyd resins, and like resins. These may be used singly, or in a combination of two or more. In particular, from the viewpoint of, for example, the water resistance of the resulting coating film, the hydroxy-containing resin (A1) is preferably a hydroxy-containing acrylic resin (A1').

Hydroxy-Containing Acrylic Resin (A1')

The hydroxy-containing acrylic resin (A1') can be obtained, for example, by copolymerizing a hydroxy-containing polymerizable unsaturated monomer and another polymerizable unsaturated monomer (polymerizable unsaturated monomer other than the hydroxy-containing polymerizable unsaturated monomer).

The hydroxy-containing polymerizable unsaturated monomer is a compound containing one or more hydroxy groups and one or more polymerizable unsaturated bonds per molecule. Examples of the hydroxy-containing polymerizable unsaturated monomer include monoesterified products of (meth)acrylic acid with a dihydric alcohol having 2 to 8 carbon atoms (e.g., 2-hydroxyethyl (meth)acrylate, 2-hydroxypropyl (meth)acrylate, 3-hydroxypropyl (meth) acrylate, and 4-hydroxybutyl (meth)acrylate); ε-caprolactone-modified products of such monoesterified products of (meth)acrylic acid with a dihydric alcohol having 2 to 8 carbon atoms; adducts of (meth)acrylic acid with an epoxy-containing compound (e.g., Cardura E10P (trade name, produced by Momentive Specialty Chemicals Inc., neodecanoic acid glycidyl ester); N-hydroxymethyl (meth)acrylamide; allyl alcohol; (meth)acrylates that include a hydroxy-terminated polyoxyethylene chain; and the like.

As another polymerizable unsaturated monomer copolymerizable with the hydroxy-containing polymerizable unsaturated monomer, for example, the monomers listed in (1) to (7) below can be used. These polymerizable unsaturated monomers may be used singly, or in a combination of two or more.

(1) Acid Group-Containing Polymerizable Unsaturated Monomers

An acid group-containing polymerizable unsaturated monomer is a compound having one or more acid groups and one or more polymerizable unsaturated bonds per molecule. Examples of the monomer include carboxy-containing monomers, such as (meth)acrylic acid, crotonic acid, itaconic acid, maleic acid, and maleic anhydride; sulfonic acid-containing monomers, such as vinyl sulfonic acid and 2-sulfoethyl (meth)acrylate; acidic phosphate monomers, such as 2-(meth)acryloyloxyethyl acid phosphate, 2-(meth)acryloyloxypropyl acid phosphate, 2-(meth)acryloyloxy-3-chloropropyl acid phosphate, and 2-methacryloyloxyethylphenyl phosphoric acid. These monomers may be used singly, or in a combination of two or more. When an acid group-containing polymerizable unsaturated monomer is used, the monomer is preferably used in such an amount that the hydroxy-containing acrylic resin (A1') has an acid value of 0.5 to 15 mg KOH/g, and more preferably 1 to 10 mg KOH/g.

(2) Esterified Products of Acrylic Acid or Methacrylic Acid with a Monohydric Alcohol Having 1 to 20 Carbon Atoms Specific examples include methyl (meth)acrylate, ethyl (meth)acrylate, propyl (meth)acrylate, n-butyl (meth)acrylate, iso-butyl (meth)acrylate, tert-butyl (meth)acrylate, 2-ethylhexyl (meth)acrylate, isooctyl (meth)acrylate, isomyristyl (meth)acrylate, stearyl (meth)acrylate, Isostearyl Acrylate (trade name, produced by Osaka Organic Chemical Industry, Ltd.), lauryl (meth)acrylate, tridecyl (meth)acrylate, tetrahydrofurfuryl (meth)acrylate, cyclohexyl (meth) acrylate, isobornyl (meth)acrylate, and the like.

(3) Alkoxysilyl Group-Containing Polymerizable Unsaturated Monomers

Specific examples include vinyltrimethoxysilane, vinyltriethoxysilane, acryloxyethyl trimethoxysilane, methacryloxyethyl trimethoxysilane, acryloxypropyl trimethoxysilane, methacryloxypropyl trimethoxysilane, acryloxypropyl triethoxysilane, methacryloxypropyl triethoxysilane, vinyltris (β-methoxyethoxy)silane, and the like. Preferable examples of alkoxysilyl group-containing polymerizable unsaturated monomers include vinyltrimethoxysilane, γ-acryloxypropyl trimethoxysilane, γ-methacryloxypropyl trimethoxysilane, and the like.

When an alkoxysilyl group-containing polymerizable unsaturated monomer is used as a constituent component, crosslinkages may be formed, in addition to the crosslinkages of hydroxy groups and the crosslinking agent (A2), by a condensation reaction of alkoxysilyl groups and a reaction of alkoxysilyl groups and hydroxy groups. It is thereby possible to improve the curability of the coating film.

(4) Aromatic-Based Vinyl Monomers

Specific examples include styrene, α-methylstyrene, vinyltoluene, and the like.

When an aromatic-based vinyl monomer is used as a constituent component, the glass transition temperature of the resulting resin is raised and a hydrophobic coating film with a high refractive index can be obtained. This achieves an excellent finished appearance by improving the gloss of the coating film.

When an aromatic-based vinyl monomer is used as a constituent component, its proportion is preferably within the range of 3 to 50 mass %, and more preferably 5 to 40 mass %, based on the total amount of the monomer components.

(5) Glycidyl Group-Containing Polymerizable Unsaturated Monomers

A glycidyl group-containing polymerizable unsaturated monomer is a compound having one or more glycidyl groups and one or more polymerizable unsaturated bonds per molecule. Specific examples include glycidyl acrylate, glycidyl methacrylate, and the like.

(6) Compounds Containing Nitrogen and a Polymerizable Unsaturated Bond

Examples include (meth)acrylamide, N,N-dimethyl (meth)acrylamide, N-[3-(dimethylamino) propyl](meth) acrylamide, N-butoxymethyl (meth)acrylamide, diacetone (meth)acrylamide, N,N-dimethylaminoethyl (meth)acrylate, vinylpyridine, vinylimidazole, acrylonitrile, methacrylonitrile, and the like.

(7) Other Vinyl Compounds

Examples include vinyl acetate, vinyl propionate, vinyl chloride, vinyl versatates, and the like. Examples of vinyl versatates include commercially available products VEOVA 9 and VEOVA 10 (trade names, produced by Japan Epoxy Resin Co., Ltd.), and the like.

As the other polymerizable unsaturated monomer, those listed in (1) to (7) above may be used singly, or in a combination of two or more.

The term "polymerizable unsaturated monomer" as used herein refers to a monomer having one or more (e.g., one to four) polymerizable unsaturated groups. The polymerizable unsaturated group refers to an unsaturated group that can undergo radical polymerization. Examples of the polymerizable unsaturated group include a vinyl group, a (meth) acryloyl group, a (meth)acrylamide group, a vinyl ether group, an allyl group, a propenyl group, an isopropenyl group, a maleimide group, and the like.

The term "(meth)acrylate" as used herein means acrylate or methacrylate. The term "(meth)acrylic acid" means acrylic acid or methacrylic acid. The term "(meth)acryloyl" means acryloyl or methacryloyl. The term "(meth)acrylamide" means acrylamide or methacrylamide.

From the viewpoint of the curability and water resistance, the hydroxy-containing acrylic resin (A1') preferably has a hydroxy value of 70 to 200 mg KOH/g, more preferably 80 to 185 mg KOH/g, and even more preferably 100 to 170 mg KOH/g.

From the viewpoint of the finished appearance and curability of the coating film, the hydroxy-containing acrylic resin (A1') preferably has a weight average molecular weight of 2000 to 50000, more preferably 3000 to 30000, and even more preferably 4000 to 10000.

In the present specification, the average molecular weight refers to a value calculated from a chromatogram measured by gel permeation chromatography based on the molecular weight of standard polystyrene. For the gel permeation chromatography, HLC8120GPC (produced by Tosoh Corporation) was used. The measurement was conducted using four columns: TSKgel G-4000HXL, TSKgel G-3000HXL, TSKgel G-2500HXL, and TSKgel G-2000HXL (trade names, all produced by Tosoh Corporation) under the following conditions: mobile phase: tetrahydrofuran; measuring temperature: 40° C.; flow rate: 1 cc/min; detector: RI.

The glass transition temperature of the hydroxy-containing acrylic resin (A1') is preferably within the range of −50 to 60° C., more preferably 10 to 50° C., and even more preferably 20 to 45° C., from the viewpoint of the hardness and finished appearance of the coating film.

In the present specification, the glass transition temperature (° C.) of the acrylic resin was calculated using the following formulae.

$$1/Tg\ (K) = (W1/T1) + (W2/T2) + \ldots \quad (1)$$

$$Tg\ (°C.) = Tg\ (K) - 273 \quad (2)$$

In each formula, W1, W2, . . . represent the mass fractions of the monomers used for copolymerization, and T1, T2, . . . represent the Tg (K) of homopolymers of each of the monomers.

T1, T2, . . . are the values disclosed in the Polymer Handbook (Second Edition, J. Brandup and E. H. Immergut ed.) III-139 to 179. When the Tg of the homopolymer of a monomer is unclear, the glass transition temperature (° C.) refers to a static glass transition temperature. For example, a sample is taken in a measuring cup and subjected to vacuum suction to completely remove the solvent, followed by measurement of changes in the quantity of heat at a heating rate of 3° C./min in a temperature range of −20 to +200° C. using a DSC-220U differential scanning calorimeter (produced by Seiko Instruments Inc.). The initial change point in the baseline at the low temperature side is considered to be the static glass transition temperature.

The hydroxy-containing acrylic resin (A1') preferably has an acid value of 0.5 to 15 mg KOH/g, and more preferably 1 to 10 mg KOH/g, from the viewpoint of, for example, the pot life of the paint composition and the finished appearance.

The method for copolymerizing the monomer mixture to obtain the hydroxy-containing acrylic resin (A1') is not particularly limited, and known copolymerization methods can be used. Among those, a solution polymerization method, in which polymerization is conducted in an organic solvent in the presence of a polymerization initiator, is preferably used.

Examples of organic solvents used in the solution polymerization method include toluene, xylene, Swasol 1000 (trade name, produced by Cosmo Oil Co., Ltd., an oil-based high-boiling-point solvent), and like aromatic-based solvents; ethyl acetate, butyl acetate, propyl propionate, butyl propionate, 1-methoxy-2-propyl acetate, 2-ethoxyethyl propionate, 3-methoxybutyl acetate, ethylene glycol ethyl ether acetate, propylene glycol methyl ether acetate, and like ester-based solvents; methyl ethyl ketone, methyl isobutyl ketone, methyl amyl ketone, and like ketone-based solvents; isopropanol, n-butanol, iso-butanol, 2-ethylhexanol, and like alcohol-based solvents; and the like.

These organic solvents may be used singly, or in a combination of two or more. From the viewpoint of the solubility of the acrylic resin, ester-based solvents and ketone-based solvents are preferable. Further, an aromatic-based solvent may be suitably used in combination.

Examples of polymerization initiators used for copolymerizing the hydroxy-containing acrylic resin (A1') include known radical polymerization initiators, such as 2,2'-azobisisobutyronitrile, benzoyl peroxide, di-t-butyl peroxide, di-t-amyl peroxide, t-butyl peroctoate, 2,2'-azobis(2-methylbutyronitrile), and 2,2'-azobis(2,4-dimethylvaleronitrile).

The hydroxy-containing acrylic resins (A1') may be used singly, or in a combination of two or more.

From the viewpoint of the finished appearance of the resulting coating film, a secondary hydroxy-containing acrylic resin (A1') can also be suitably used as the hydroxy-containing acrylic resin (A1').

The secondary hydroxy-containing acrylic resin (A1") can be produced, for example, by using a secondary hydroxy-containing polymerizable unsaturated monomer as a hydroxy-containing polymerizable unsaturated monomer described above in the method for producing the hydroxy-containing acrylic resin (A1').

Examples of the secondary hydroxy-containing polymerizable unsaturated monomer include polymerizable unsaturated monomers having a secondary hydroxy group whose alkyl group in the ester moiety has 2 to 8, preferably 3 to 6, and more preferably 3 or 4 carbon atoms, such as 2-hydroxypropyl (meth)acrylate, 2-hydroxybutyl (meth)acrylate, and 3-hydroxybutyl (meth)acrylate; adducts of (meth) acrylic acid with an epoxy-containing compound (e.g., Cardura E10P (trade name, produced by Momentive Specialty Chemicals Inc., neodecanoic acid glycidyl ester); and the like. These may be used singly, or in a combination of two or more. From the viewpoint of the finished appearance of the resulting coating film, 2-hydroxypropyl (meth)acrylate is preferable.

When a secondary hydroxy-containing polymerizable unsaturated monomer described above is used in producing the secondary hydroxy-containing acrylic resin (A1"), it is preferred that the amount of the secondary hydroxy-containing polymerizable unsaturated monomer is within the range of 15 to 45 mass %, and preferably 20 to 40 mass %, based on the total amount of the copolymerizable monomer components, from the viewpoint of the finished appearance of the resulting coating film.

In the secondary hydroxy-containing acrylic resin (A1"), it is preferred that the proportion of the secondary hydroxy-containing polymerizable unsaturated monomer in the total amount of the hydroxy-containing polymerizable unsaturated monomer is within the range of 50 to 100 mass %, preferably 55 to 100 mass %, and more preferably 60 to 100 mass %, from the viewpoint of the water resistance and finished appearance of the resulting coating film.

Examples of film-forming resins, other than the hydroxy-containing acrylic resin (A1'), usable as the binder component (A) in the paint composition of the present invention include acrylic resins containing no hydroxy groups, hydroxy-containing polyester resins or polyester resins containing no hydroxy groups, hydroxy-containing polyether resins or polyether resins containing no hydroxy groups, hydroxy-containing polyurethane resins or polyurethane resins containing no hydroxy groups, and the like. Of these, preferable examples of film-forming resins include hydroxy-containing polyester resins and hydroxy-containing polyurethane resins.

The hydroxy-containing polyester resin can be produced by a usual method, such as by an esterification reaction of a polybasic acid and polyhydric alcohol. The polybasic acid is a compound having two or more carboxy groups per molecule. Examples include phthalic acid, isophthalic acid, terephthalic acid, succinic acid, adipic acid, azelaic acid, sebacic acid, tetrahydrophthalic acid, hexahydrophthalic acid, maleic acid, fumaric acid, itaconic acid, trimellitic acid, pyromellitic acid, anhydrides thereof, and the like. The polyhydric alcohol is a compound having two or more hydroxy groups per molecule. Examples include diols, such as ethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxypivalic acid neopentyl glycol ester, 2-butyl-2-ethyl-1,3-propanediol, 3-methyl-1,5-pentanediol, 2,2,4-trimethyl pentanediol, and hydrogenation bisphenol A; trihydric or higher polyol components, such as trimethylolpropane, trimethylolethane, glycerol, and pentaerythritol; hydroxycarboxylic acids, such as 2,2-dimethylolpropionic acid, 2,2-dimethylolbutanoic acid, 2,2-dimethylolpentanoic acid, 2,2-dimethylolhexanoic acid, and 2,2-dimethyloloctanoic acid; and the like.

Alternatively, for example, a monoepoxy compound, such as α-olefin epoxide (e.g., propylene oxide, butylene oxide) or Cardura E10P (trade name, produced by Momentive Specialty Chemicals Inc., synthetic highly branched saturated fatty acid glycidyl ester) may be reacted with an acid, and the resulting compound may be introduced into the polyester resin.

Carboxy groups can be introduced into the polyester resin by, for example, adding an acid anhydride to a hydroxy-containing polyester for half-esterification.

The hydroxy-containing polyester resin preferably has a hydroxy value of 80 to 250 mg KOH/g, and more preferably 100 to 200 mg KOH/g. The hydroxy-containing polyester resin preferably has a weight average molecular weight of 500 to 3,500, and more preferably 500 to 2,500.

Examples of hydroxy-containing polyurethane resins include hydroxy-containing polyurethane resins that are obtainable by a reaction of a polyol and a polyisocyanate.

Examples of low molecular weight polyols include ethylene glycol, diethylene glycol, propylene glycol, butylene glycol, hexamethylene glycol, and like dihydric alcohols; trimethylolpropane, glycerol, pentaerythritol, and like trihydric alcohols; and the liked. Examples of higher molecular weight polyols include polyether polyols, polyester polyols, acrylic polyols, epoxy polyols, and the like. Examples of polyether polyols include polyethylene glycol, polypropylene glycol, polytetramethylene glycol, and the like. Examples of polyester polyols include polycondensates of the dihydric alcohols described above, dipropylene glycol, 1,4-butanediol, 1,6-hexanediol, neopentyl glycol, or like alcohols with a dibasic acid, such as adipic acid, azelaic acid, or sebacic acid; polyols obtained by ring-opening polymerization of a lactone, such as polycaprolactone; polycarbonate diols; and the like. It is also possible to use, for example, carboxy-containing polyols, such as 2,2-dimethylolpropionic acid and 2,2-dimethylolbutanoic acid.

Examples of polyisocyanates to be reacted with such polyols include aliphatic polyisocyanates, such as hexamethylene diisocyanate, trimethylhexamethylene diisocyanate, dimer acid diisocyanate, and lysine diisocyanate; biuret adducts and isocyanurate ring adducts of such polyisocyanates; alicyclic diisocyanates, such as isophorone diisocyanate, 4,4'-methylenebis(cyclohexylisocyanate), methylcyclohexane-2,4- (or -2,6-)diisocyanate, 1,3- (or 1,4-) di(isocyanatomethyl)cyclohexane, 1,4-cyclohexane diisocyanate, 1,3-cyclopentane diisocyanate, and 1,2-cyclohexane diisocyanate; biuret adducts and isocyanurate ring adducts of such polyisocyanates; aromatic diisocyanate compounds, such as xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4-toluidine diisocyanate, 4,4'-diphenylether diisocyanate, m- (or p-)phenylene diisocyanate, 4,4'-biphenylene diisocyanate, 3,3'-dimethyl-4,4'-biphenylene diisocyanate, bis(4-isocyanatophenyl) sulfone, and isopropylidene bis(4-phenylisocyanate); biuret adducts and isocyanurate ring adducts of such polyisocyanates; polyisocyanates having three or more isocyanate groups per molecule, such as triphenylmethane-4,4',4"-triisocyanate, 1,3,5-triisocyanatobenzene, 2,4,6-triisocyanatotoluene, and 4,4'-dimethyldiphenylmethane-2,2',5,5'-tetraisocyanate; biuret adducts and isocyanurate ring adducts of such polyisocyanates; and the like.

The hydroxy-containing polyurethane resin preferably has a hydroxy value of 80 to 250 mg KOH/g, and more preferably 100 to 200 mg KOH/g. The hydroxy-containing polyurethane resin preferably has a weight average molecular weight of 500 to 10000, and more preferably 1000 to 5000.

When the hydroxy-containing acrylic resin (A1') and a resin other than the hydroxy-containing acrylic resin (A1') (more specifically, e.g., polyester resin, polyurethane resin, polyether resin) are used in combination as the binder component (A), it is preferred that the content of the resin other than the hydroxy-containing acrylic resin (A1') is within the range of 50 parts by mass or less, and preferably 1 to 20 parts by mass, based on 100 parts by mass of the solids content of the hydroxy-containing acrylic resin (A1').

Crosslinking Agent (A2)

The crosslinking agent (A2) is a compound having a functional group that can react with a hydroxy group of the hydroxy-containing resin (A1).

Specific preferable examples of the crosslinking agent (A2) include polyisocyanate compounds, blocked polyisocyanate compounds, amino resins, and the like. From the viewpoint of the finished appearance, scratch resistance, and the like, the crosslinking agent (A2) preferably contains a polyisocyanate compound.

The polyisocyanate compound is a compound having at least two isocyanate groups per molecule. Examples include aliphatic polyisocyanate compounds, alicyclic polyisocyanate compounds, aromatic-aliphatic polyisocyanate compounds, aromatic polyisocyanate compounds, derivatives of these polyisocyanate compounds, and the like.

Examples of aliphatic polyisocyanate compounds include aliphatic diisocyanate compounds, such as trimethylene diisocyanate, cetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); aliphatic triisocyanate compounds, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane; and the like.

Examples of alicyclic polyisocyanate compounds include alicyclic diisocyanate compounds, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, and methylenebis(4,1-cyclohexanediyl) diisocyanate (common name: hydrogenated MDI), and norbornane diisocyanate; alicyclic triisocyanate compounds, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1) heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1) heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1) heptane, and 6-(2-isocyanatoethyl)-2-isocyanatomethyl-2-(3-isocyanatopropyl)-bicyclo(2.2.1)heptane; and the like.

Examples of aromatic-aliphatic polyisocyanate compounds include aromatic-aliphatic diisocyanate compounds, such as methylenebis(4,1-phenylene)diisocyanate (common name: MDI), 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; aromatic-aliphatic triisocyanate compounds, such as 1,3,5-triisocyanatomethylbenzene; and the like.

Examples of aromatic polyisocyanate compounds include aromatic diisocyanate compounds, such as m-phenylene diisocyanate, p-phenylene diisocyanate, 4,4'-diphenyldiisocyanate, 1,5-naphthalene diisocyanate, 2,4-tolylene diisocyanate (common name: 2,4-TDI) or 2,6-tolylene diisocyanate (common name: 2,6-TDI) or mixtures thereof, 4,4'-toluidine diisocyanate, and 4,4'-diphenylether diisocyanate; aromatic triisocyanate compounds, such as triphenylmethane-4,4',4"-triisocyanate, 1,3,5-triisocyanatobenzene, and 2,4,6-triisocyanatotoluene; aromatic tetraisocyanate compounds, such as 4,4'-diphenylmethane-2,2',5,5'-tetraisocyanate; and the like.

Examples of derivatives of the polyisocyanate compounds include dimers, trimers, biurets, allophanates, uretidiones, urethimine, isocyanurates, oxadiazinetriones, polymethylene polyphenyl polyisocyanates (crude MDI, polymeric MDI), crude TDI, and the like, of the polyisocyanate compounds mentioned above.

The above polyisocyanate compounds and derivatives thereof may be used singly, or in a combination of two or more.

From the viewpoint of the weatherability of the resulting coating film, at least one member selected from the group consisting of aliphatic polyisocyanate compounds, alicyclic polyisocyanate compounds, and derivatives thereof is preferably used as a polyisocyanate compound. From the viewpoint of an increase in the solids content of the obtained paint composition, and the finished appearance and scratch resistance of the resulting coating film, it is more preferable to use an aliphatic polyisocyanate compound and/or a derivative thereof.

As the aliphatic polyisocyanate compound and/or a derivative thereof, it is preferable to use an aliphatic diisocyanate compound and/or an isocyanurate thereof, and more preferable to use hexamethylene diisocyanate and/or an isocyanurate thereof, from the viewpoint of an increase in the solids content of the obtained paint composition, and the finished appearance and scratch resistance of the resulting coating film.

When the paint composition of the present invention contains a polyisocyanate compound described above as the crosslinking agent (A2), it is preferred that the proportion of the polyisocyanate compound is within the range of 5 to 60 parts by mass, preferably 15 to 50 parts by mass, and more preferably 25 to 45 parts by mass, based on 100 parts by mass of the total solids content of the hydroxy-containing resin (A1) and the crosslinking agent (A2), from the viewpoint of the finished appearance and scratch resistance of the resulting coating film.

The blocked polyisocyanate compound usable as the crosslinking agent (A2) is a compound obtained by blocking isocyanate groups of a polyisocyanate compound described above with a blocking agent.

Examples of blocking agents include phenol compounds, such as phenol, cresol, xylenol, nitrophenol, ethylphenol, hydroxydiphenyl, butylphenol, isopropylphenol, nonylphenol, octylphenol, and methyl hydroxybenzoate; lactam compounds, such as ε-caprolactam, δ-valerolactam, γ-butyrolactam, and β-propiolactam; aliphatic alcohol compounds, such as methanol, ethanol, propyl alcohol, butyl alcohol, amyl alcohol, and lauryl alcohol; ether compounds, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohol compounds, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oxime compounds, such as formamide oxime, acetamide oxime, acetoxime, methyl ethyl ketoxime, diacetyl monoxime, benzophenone oxime, and cyclohexane oxime; active methylene compounds, such as dimethyl malonate, diethyl malonate, ethyl acetoacetate, methyl acetoacetate, and acetylacetone; mercaptan compounds, such as butyl mercaptan, t-butyl mercaptan, hexyl mercaptan, t-dodecyl mercaptan, 2-mercaptobenzothiazole, thiophenol, methylthiophenol, and ethylthiophenol; acid amide compounds, such as acetanilide, acetanisidide, acetotoluide, acrylamide, methacrylamide, acetic acid amide, stearic acid amide, and benzamide; imide compounds, such as succinimide, phthalimide, and maleimide; amine compounds, such as diphenylamine, phenylnaphthylamine, xylidine, N-phenylxylidine, carbazole, aniline, naphthylamine, butylamine, dibutylamine, and butylphenylamine; imidazole compounds, such as imidazole and 2-ethylimidazole; urea compounds, such as urea, thiourea, ethylene urea, ethylenethiourea, and diphenylurea; carbamate compounds, such as phenyl N-phenylcarbamate; imine compounds, such as ethyleneimine and propyleneimine; sulfite compounds, such as sodium bisulfite and potassium bisulfite; azole compounds; and the like. Examples of such azole compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; imidazoline derivatives, such as 2-methylimidazoline and 2-phenylimidazoline; and the like.

Particularly preferable blocking agents are, for example, oxime-based blocking agents, active methylene-based blocking agents, and pyrazole or pyrazole derivatives.

When blocking is performed (a blocking agent is reacted), it can be performed by adding a solvent, if necessary. As the solvent used in the blocking reaction, a solvent that is not reactive with an isocyanate group is preferably used. Examples include ketones, such as acetone and methyl ethyl ketone; esters, such as ethyl acetate; N-methyl-2-pyrrolidone (NMP); and like solvents.

When the paint composition of the present invention contains a blocked polyisocyanate compound described above as the crosslinking agent (A2), it is preferred that the proportion of the blocked polyisocyanate compound is within the range of 5 to 60 parts by mass, preferably 15 to 50 parts by mass, and more preferably 25 to 45 parts by mass, based on 100 parts by mass of the total solids content of the hydroxy-containing resin (A1) and the crosslinking agent (A2), from the viewpoint of the finished appearance and scratch resistance of the resulting coating film.

When the paint composition of the present invention contains a polyisocyanate compound and/or a blocked polyisocyanate compound described above as the crosslinking agent (A2), the proportion thereof is preferably such that the equivalent ratio (NCO/OH) of the total of the isocyanate groups (including blocked isocyanate groups) in the polyisocyanate compound and the blocked polyisocyanate compound to the hydroxy groups in the hydroxy-containing resin (A1) is generally within the range of 0.5 to 2, and preferably 0.8 to 1.5, from the viewpoint of the water resistance and finished appearance of the resulting coating film.

Amino resins usable as the crosslinking agent (A2) include partially or fully methylolated amino resins obtained by a reaction of an amino component with an aldehyde component. Examples of amino components include melamine, urea, benzoguanamine, acetoguanamine, steroguanamine, spiroguanamine, dicyandiamide, and the like. Examples of aldehyde components include formaldehyde, paraformaldehyde, acetaldehyde, benzaldehyde, and the like.

Also usable are those obtained by etherifying some or all of the methylol groups of the above methylolated amino resins with a suitable alcohol. Examples of alcohols usable for etherification include methyl alcohol, ethyl alcohol, n-propyl alcohol, isopropyl alcohol, n-butyl alcohol, isobutyl alcohol, 2-ethylbutanol, 2-ethylhexanol, and the like.

Preferred amino resins are melamine resins. Examples of usable melamine resins include alkyl-etherified melamine resins obtained by etherifying some or all of the methylol groups of partially or fully methylolated melamine resins with the alcohol.

Preferable examples of alkyl-etherified melamine resins include methyl-etherified melamine resins obtained by etherifying some or all of the methylol groups of partially or fully methylolated melamine resins with methyl alcohol; butyl-etherified melamine resins obtained by etherifying some or all of the methylol groups of partially or fully methylolated melamine resins with butyl alcohol; methyl-butyl mixed etherified melamine resins obtained by etherifying some or all of the methylol groups of partially or fully methylolated melamine resins with methyl alcohol and butyl alcohol; and the like.

It is preferred that the melamine resin has a weight average molecular weight of 400 to 6000, preferably 500 to 5000, and more preferably 800 to 4000.

A commercially available product can be used as the melamine resin. Examples of the commercially available product include Cymel 202, Cymel 203, Cymel 238, Cymel 251, Cymel 303, Cymel 323, Cymel 324, Cymel 325, Cymel 327, Cymel 350, Cymel 385, Cymel 1156, Cymel 1158, Cymel 1116, Cymel 1130, (all produced by Allnex Japan Inc.), U-VAN 120, U-VAN 20HS, U-VAN 20SE60, U-VAN 2021, U-VAN 2028, U-VAN 28-60 (all produced by Mitsui Chemicals, Inc.), and the like.

The melamine resins described above may be used singly, or in a combination of two or more.

When the paint composition of the present invention contains an amino resin described above as the crosslinking agent (A2), it is preferred that its proportion is within the range of 0.5 to 40 parts by mass, preferably 1.0 to 15 parts by mass, more preferably 1.5 to 10 parts by mass, and even more preferably 1.5 to 5 parts by mass, based on 100 parts by mass of the total solids content of the hydroxy-containing resin (A1) and crosslinking agent (A2), from the viewpoint of the transparency, water resistance and finished appearance of the resulting coating film.

The crosslinking agents (A2) may be used singly, or in a combination of two or more.

Rheology Control Agent (B)

The rheology control agent (B) contains a reaction product of (b1) a polyisocyanate compound, (b2) a primary monoamine having a number average molecular weight of 300 or less, and (b3) a polyether amine having a number average molecular weight of more than 300 but less than 6000.

Polyisocyanate Compound (b1)

As the polyisocyanate compound (b1), for example, a polyisocyanate compound described in the explanation of the crosslinking agent (A2) can be used.

The polyisocyanate compound (b1) is preferably an aliphatic polyisocyanate compound and/or a derivative thereof, more preferably an aliphatic diisocyanate compound and/or an isocyanurate thereof, from the viewpoint of the transparency, water resistance, and finished appearance of the resulting coating film. Among these, hexamethylene diisocyanate and/or an isocyanurate thereof is preferable, and hexamethylene diisocyanate is more preferable.

Primary Monoamine Having a Number Average Molecular Weight of 300 or Less (b2)

Examples of the primary monoamine having a number average molecular weight of 300 or less (b2) include benzylamine, ethylamine, n-propylamine, sec-propylamine, n-butylamine, sec-butylamine, tert-butylamine, n-pentylamine, α-methylbutylamine, α-ethylpropylamine, β-ethylbutylamine, hexylamine, octylamine, 2-ethylhexylamine, n-decylamine, 1-aminooctadecane (stearylamine), cyclohexylamine, aniline, 2-(2-aminoethoxy)ethanol, and the like. The primary monoamines (b2) may be used singly, or in a combination of two or more.

As the primary monoamine having a number average molecular weight of 300 or less (b2), a benzene ring-containing primary monoamine is preferable, and benzylamine is more preferable, from the viewpoint of the transparency, water resistance and finished appearance of the resulting coating film.

It is preferred that the number average molecular weight of the primary monoamine having a number average molecular weight of 300 or less (b2) is within the range of 60 to 300, preferably 75 to 250, and more preferably 90 to 150, from the viewpoint of the transparency, water resistance and finished appearance of the resulting coating film.

Polyether Amine Having a Number Average Molecular Weight of More than 300 but Less than 6000 (b3)

The polyether amine (b3) is an amine having a number average molecular weight of more than 300 but less than 6000 and containing two or more ether linkages per molecule.

In particular, it is preferred that the number average molecular weight of the polyether amine (b3) is within the range of 300 to 4000, preferably 320 to 3000, and more preferably 350 to 2000, from the viewpoint of the transparency, water resistance and finished appearance of the resulting coating film.

From the viewpoint of the transparency, water resistance and finished appearance of the resulting coating film, the polyether amine (b3) is preferably a primary amine.

The polyether amine (b3) is preferably at least one amine selected from the group consisting of monoamines, diamines, and triamines from the viewpoint of the transparency of the resulting coating film. In particular, the polyether amine (b3) is more preferably a diamine from the viewpoint of the transparency, water resistance and finished appearance of the resulting coating film.

Therefore, from the viewpoint of the transparency, water resistance and finished appearance of the resulting coating film, the polyether amine (b3) is preferably at least one amine selected from the group consisting of primary monoamines, primary diamines, and primary triamines, and more preferably a primary diamine. In the present invention, the primary diamine is an amine having two —$NH_2$ groups, and the primary triamine is an amine having three —$NH_2$ groups.

As the polyether amine (b3), for example, a polyoxyalkylene-containing amine can be preferably used.

From the viewpoint of the transparency of the resulting coating film, at least one amine compound selected from the group consisting of polyoxyalkylene-containing monoamines represented by formula (1) below (b3-1), polyoxyalkylene-containing diamines represented by formula (3) below (b3-2), and polyoxyalkylene-containing polyamines having three or more amino groups represented by formula (6) below (b3-3) can be preferably used as the polyoxyalkylene-containing amine.

Of these, the polyoxyalkylene-containing diamine (b3-2) can be particularly preferably used from the viewpoint of the transparency, water resistance and finished appearance of the resulting coating film.

Polyoxyalkylene-Containing Monoamine (b3-1)

The polyoxyalkylene-containing monoamine (b3-1) is a polyoxyalkylene-containing monoamine represented by formula (1) below.

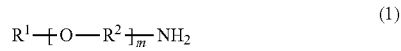

(wherein $R^1$ represents a monovalent organic group, preferably a monovalent hydrocarbon group, more preferably a $C_{1-4}$ alkyl group; $R^2$ represents a $C_{2-6}$ alkylene group, preferably a $C_{2-4}$ alkylene group, more preferably at least one alkylene group selected from the group consisting of an ethylene group, a propylene group, and a tetramethylene group; m represents an integer of 2 to 70, preferably 4 to 60, more preferably 5 to 50; m oxyalkylene units (O—$R^2$) may be the same or different; when the oxyalkylene units (O—$R^2$) are different from each other, the form of addition (polymerization form) of the oxyalkylene units (O—$R^2$) may be a random form or a block form.)

Specifically, as the polyoxyalkylene-containing monoamine (b3-1), a polyoxyalkylene-containing monoamine represented by formula (2) below can be preferably used.

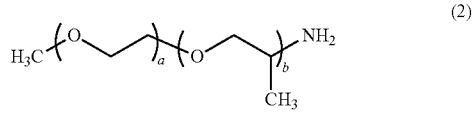

(wherein a represents an integer of 1 to 35, preferably 1 to 30, more preferably 1 to 25; and b represents an integer of 1 to 35, preferably 2 to 30, and more preferably 3 to 25.)

A commercially available product can be used as the polyoxyalkylene-containing monoamine (b3-1). Examples of the commercially available product include JEFFAMINE M-600 (number average molecular weight: 600; in formula (2) above, a=1, and b=9), JEFFAMINE M-1000 (number average molecular weight: 1000; in formula (2) above, a=19, and b=3), JEFFAMINE M-2005 (number average molecular weight: 2000; in formula (2) above, a=6, and b=29), JEFFAMINE M-2070 (number average molecular weight: 2000;

in formula (2) above, a=31, and b=10) produced by Huntsman Corporation, and the like.

Polyoxyalkylene-Containing Diamine (b3-2)

The polyoxyalkylene-containing diamine (b3-2) is a polyoxyalkylene-containing diamine represented by formula (3) below.

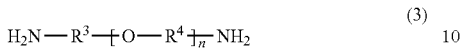

(3)

(wherein $R^3$ represents a $C_{2-6}$ alkylene group, preferably a $C_{2-4}$ alkylene group, more preferably at least one alkylene group selected from the group consisting of an ethylene group, a propylene group, and a tetramethylene group; $R^4$ represents a $C_{2-6}$ alkylene group, preferably a $C_{2-4}$ alkylene group, more preferably at least one alkylene group selected from the group consisting of an ethylene group, a propylene group, and a tetramethylene group; n represents an integer of 2 to 70, preferably 4 to 60, more preferably 5 to 50; n oxyalkylene units (O—$R^4$) may be the same or different; when the oxyalkylene units (O—$R^4$) are different from each other, the form of addition (polymerization form) of the oxyalkylene units (O—$R^4$) may be a random form or a block form.)

Specifically, as the polyoxyalkylene-containing diamine (b3-2), a polyoxyalkylene-containing diamine represented by formula (4) below

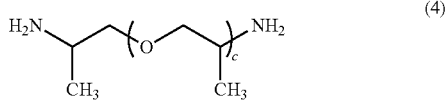

(4)

(wherein c represents an integer of 2 to 70, preferably 3 to 60, and more preferably 4 to 50)
and/or a polyoxyalkylene-containing diamine represented by formula (5) below

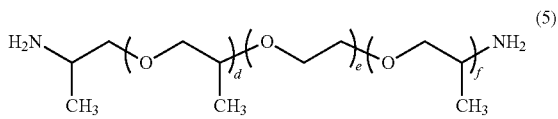

(5)

(wherein d and f each represent an integer of 0 to 40, preferably 1 to 20, more preferably 1 to 10; e represents an integer of 2 to 40, preferably 4 to 35, more preferably 6 to 30; d+f is within the range of 1 to 80, in particular, preferably 1 to 10, more preferably 2 to 9, even more preferably 3 to 8) can be preferably used.

A commercially available product can be used as the polyoxyalkylene-containing diamine (b3-2). Examples of the commercially available product include JEFFAMINE D-400 (number average molecular weight: 430; in formula (4) above, c≈6.1 (average value)), JEFFAMINE D-2000 (number average molecular weight: 2000; in formula (4) above, c≈33), JEFFAMINE D-4000 (number average molecular weight: 4000; in formula (4) above, c≈68), JEFFAMINE ED-600 (number average molecular weight: 600; in formula (5) above, d+f≈3.6 (average value), e≈9), JEFFAMINE ED-900 (number average molecular weight: 900; in formula (5) above, d+f≈6, e≈12.5 (average value)), JEFFAMINE ED-2003 (number average molecular weight: 2000; in formula (5) above, d+f≈6, e≈39), ELASTAMINE RT-1000 (number average molecular weight: 1000) produced by Huntsman Corporation, and the like.

Polyoxyalkylene-Containing Polyamine (b3-3)

The polyoxyalkylene-containing polyamine (b3-3) is a polyoxyalkylene-containing polyamine having three or more amino groups represented by formula (6) below

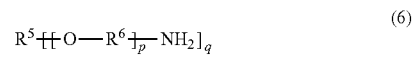

(6)

(wherein $R^5$ represents a q-valent organic group having a carbon atom at a bonding site with the oxygen atom indicated in the formula, preferably a q-valent hydrocarbon group; $R^6$ represents a $C_{2-6}$ alkylene group, preferably a $C_{2-4}$ alkylene group, more preferably at least one alkylene group selected from the group consisting of an ethylene group, a propylene group, and a tetramethylene group; p represents an integer of 2 to 70, preferably 4 to 60, more preferably 5 to 50; q represents an integer of 3 or more, preferably 3 to 6, more preferably 3 or 4; p oxyalkylene units (O—$R^6$) may be the same or different; when the oxyalkylene units (O—$R^6$) are different from each other, the form of addition (polymerization form) of the oxyalkylene units (O—$R^6$) may be a random form or a block form.)

Specifically, as the polyoxyalkylene-containing polyamine (b3-3), a polyoxyalkylene-containing triamine represented by formula (7) below

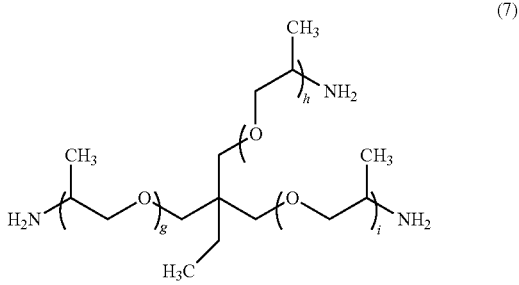

(7)

(wherein g, h, and i each represent an integer of 1 to 40, preferably 1 to 30, more preferably 1 to 20; in particular, it is preferred that g+h+i is within the range of 3 to 40, preferably 4 to 30, more preferably 5 to 20.)
and/or a polyoxyalkylene-containing triamine represented by formula (8) below

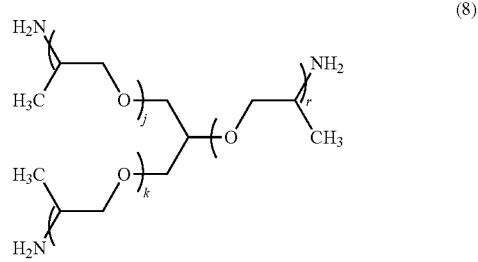

(8)

(wherein j, k, and r each represent an integer of 1 to 90, preferably 1 to 75, more preferably 1 to 60; in particular, it is preferred that j+k+r is within the range of 3 to 90, preferably 4 to 75, more preferably 5 to 60) can be preferably used.

A commercially available product can be used as the polyoxyalkylene-containing polyamine (b3-3). Examples of the commercially available product include JEFFAMINE T-403 (number average molecular weight: 440; in formula (7) above, g+h+i=5 to 6), JEFFAMINE T-3000 (number average molecular weight: 3000; in formula (8) above, j+k+r≈50), JEFFAMINE T-5000 (number average molecular weight: 5000; in formula (8) above, j+k+r≈85) produced by Huntsman Corporation, and the like.

Reaction Method

The reaction of the polyisocyanate compound (b1), the primary monoamine having a number average molecular weight of 300 or less (b2), and the polyether amine having a number average molecular weight of more than 300 but less than 6000 (b3) can be generally performed by mixing the components (b1) to (b3) according to a freely selected method at, if necessary, elevated temperature. It is preferred that the reaction is performed at a temperature of 5 to 80° C., and preferably 10 to 60° C.

Through this reaction, carbonyls of the polyisocyanate compound (b1) and amines of the primary monoamine having a number average molecular weight of 300 or less (b2) and the polyether amine having a number average molecular weight of more than 300 but less than 6000 (b3) form urea linkages, resulting in the formation of a crosslinked structure.

The components (b1) to (b3) can be generally mixed by a freely selected method. Preferably, the polyisocyanate compound (b1) is added to a mixture of the primary monoamine (b2) and the polyether amine (b3). If necessary, the components may be mixed in several stages. The reaction of the components (b1) to (b3) is preferably performed in the presence of an organic solvent.

Examples of organic solvents include toluene, xylene, Swasol 1000 (trade name, produced by Cosmo Oil Co., Ltd., an oil-based high-boiling-point solvent), and like aromatic-based solvents; mineral spirit and like aliphatic solvents; ethyl acetate, butyl acetate, propyl propionate, butyl propionate, 1-methoxy-2-propyl acetate, 2-ethoxyethyl propionate, 3-methoxybutyl acetate, ethylene glycol ethyl ether acetate, propylene glycol methyl ether acetate, and like ester-based solvents; methyl ethyl ketone, methyl isobutyl ketone, methyl amyl ketone, and like ketone-based solvents; isopropanol, n-butanol, iso-butanol, 2-ethylhexanol, and like alcohol-based solvents; and the like.

Upon the reaction of the components (b1) to (b3), the proportions of the components (b1) to (b3) are preferably within the following ranges based on the total amount of the components (b1) to (b3) from the viewpoint of the transparency, water resistance and finished appearance of the resulting coating film: Polyisocyanate compound (b1): 30 to 60 mass %, preferably 35 to 55 mass %, and more preferably 40 to 50 mass %;

Primary monoamine having a number average molecular weight of 300 or less (b2): 35 to 65 mass %, preferably 40 to 62 mass %, and more preferably 45 to 60 mass %; and Polyether amine having a number average molecular weight of more than 300 but less than 6000 (b3): 0.5 to 15 mass %, preferably 1 to 10 mass %, and more preferably 1.5 to 8 mass %.

Upon the reaction of the components (b1) to (b3), it is preferred that the ratio of the total number of amino groups in the primary monoamine (b2) and the polyether amine (b3) to the number of isocyanate groups in the polyisocyanate compound (b1) (amino groups/isocyanate groups) is within the range of 0.7 to 1.5, preferably 0.9 to 1.1, and more preferably 0.95 to 1.05, from the viewpoint of the transparency, water resistance and finished appearance of the resulting coating film.

In the present invention, the rheology control agent (B) may generally contain a reaction product of the polyisocyanate compound (b1) and the primary monoamine (b2) and may further contain a reaction product of the polyisocyanate compound (b1) and the polyether amine (b3), in addition to the reaction product of the polyisocyanate compound (b1), the primary monoamine (b2), and the polyether amine (b3).

Moreover, the reaction of the components (b1) to (b3) is preferably performed in the presence of a resin component from the viewpoint of suppressing the aggregation of the reaction product.

Examples of resin components include acrylic resins, polyester resins, polyether resins, polycarbonate resins, polyurethane resins, epoxy resins, alkyd resins, and the like. Of these, acrylic resins are preferable from the viewpoint of the transparency, water resistance and finished appearance of the resulting coating film. The resin component may be the binder component (A) or a resin component that is different from the binder component (A). Preferably, the binder component (A) is used as the resin component.

When the reaction of the components (b1) to (b3) is performed in the presence of the aforementioned resin component, the mixing ratio of the components (b1) to (b3) and the resin component is preferably such that the ratio of the total mass of the components (b1) to (b3) to the mass of the resin component, i.e., the (total mass of the components (b1) to (b3))/(mass of the resin component) ratio, is within the range of 3/97 to 15/85, and preferably 5/95 to 12/88.

In the present invention, when the reaction of the components (b1) to (b3) is performed in the presence of the resin component, the resin component is not included in the rheology control agent (B).

Paint Composition

The paint composition of the present invention (hereinafter sometimes simply referred to as "the paint of the present invention") is a paint composition containing the binder component (A) and the rheology control agent (B).

From the viewpoint of the transparency, water resistance and finished appearance of the resulting coating film, it is preferred that the content of the rheology control agent (B) in the paint composition of the present invention is within the range of 0.1 to 3 parts by mass, preferably 0.2 to 2.7 parts by mass, and more preferably 0.3 to 2.5 parts by mass, based on 100 parts by mass of the total solids content of the binder component (A).

Use of the paint composition of the present invention makes it possible to form a coating film excellent in transparency, water resistance, and finished appearance. The reason for this is assumed to be as follows:

The rheology control agent (B), which contains a reaction product of the polyisocyanate compound (b1), the primary monoamine having a number average molecular weight of 300 or less (b2), and the polyether amine having a number average molecular weight of more than 300 but less than 6000 (b3), forms a network in the paint composition to exert sag control capability, thus improving the finished appearance. Further, use of the primary monoamine (b2), which has a relatively low molecular weight, and the polyether amine (b3), which has a relatively high molecular weight, in combination as an amine component improve the solubility of the rheology control agent (B), which contains the reaction product, during the coating film formation, and so a coating film excellent in transparency and water resistance is formed.

The paint composition of the present invention may further contain, if necessary, color pigments, effect pigments, dyes, or the like. The paint composition of the present invention may also further contain extender pigments, ultraviolet absorbers, light stabilizers, catalysts, antifoaming agents, rheology control agents other than the rheology control agent (B), anticorrosives, surface-adjusting agents, organic solvents, or the like.

Examples of color pigments include titanium oxide, zinc white, carbon black, cadmium red, molybdenum red, chrome yellow, chromium oxide, Prussian blue, cobalt blue, azo pigments, phthalocyanine pigments, quinacridone pigments, isoindoline pigments, threne pigments, perylene pigments, and the like.

Examples of effect pigments include aluminum powder, mica powder, titanium oxide-coated mica powder, and the like.

Examples of extender pigments include talc, clay, kaolin, baryta, barium sulfate, barium carbonate, calcium carbonate, alumina white, and the like.

The above pigments may be used singly, or in a combination of two or more.

When the paint composition of the present invention is used as clear paint and contains a pigment, the pigment is preferably used in such an amount that the transparency of the resulting coating film is not impaired. For example, the amount of the pigment is generally within the range of 0.1 to 20 mass %, preferably 0.3 to 10 mass %, and more preferably 0.5 to 5 mass %, based on the total solids content in the paint composition.

When the paint composition of the present invention is used as colored paint and contains a pigment, the amount of the pigment is generally within the range of 1 to 200 mass %, preferably 2 to 100 mass %, and more preferably 5 to 50 mass %, based on the total solids content in the paint composition.

"Solids content" as used herein refers to the non-volatile components of the resin, curing agent, pigment, or the like remaining in the paint composition after drying the paint composition at 110° C. for 1 hour. For example, the total solids content of the paint composition can be calculated as follows. The paint composition is measured in a heat-resistant container such as an aluminum foil cup, spread at the bottom of the container, and then dried at 110° C. for 1 hour, after which the mass of the components in the paint composition remaining after drying is measured to determine the ratio of the mass of the components remaining after drying with respect to the total mass of the paint composition before drying.

Examples of ultraviolet absorbers include known ultraviolet absorbers, such as benzotriazole absorbers, triazine absorbers, salicylic acid derivative absorbers, benzophenone absorbers, and like ultraviolet absorbers. These ultraviolet absorbers may be used singly, or in a combination of two or more.

When the paint composition of the present invention contains a ultraviolet absorber, the amount of the ultraviolet absorber is generally within the range of 0.1 to 10 mass %, preferably 0.2 to 5 mass %, and more preferably 0.3 to 2 mass %, based on the total solids content in the paint composition.

Examples of light stabilizers include known light stabilizers, such as hindered amine light stabilizers.

As the hindered amine light stabilizer, a hindered amine light stabilizer having a low basicity can be preferably used from the viewpoint of the pot life. Examples of such hindered amine light stabilizers include acylated hindered amines, amino ether-based hindered amines, and the like. Specific examples include HOSTAVIN 3058 (trade name, produced by Clariant), TINUVIN 123 (trade name, produced by BASF), and the like.

When the paint composition of the present invention contains a light stabilizer, the amount of the light stabilizer is generally within the range of 0.1 to 10 mass %, preferably 0.2 to 5 mass %, and more preferably 0.3 to 2 mass %, based on the total solids content in the paint composition.

Examples of catalysts include known catalysts. For example, when the paint composition of the present invention contains the above-mentioned polyisocyanate compound and/or blocked polyisocyanate compound as the crosslinking agent (A2), the paint composition of the present invention may contain a urethanization reaction catalyst.

Specific examples of urethanization reaction catalysts include organometallic compounds, such as tin octylate, dibutyltin diacetate, dibutyltin di(2-ethylhexanoate), dibutyltin dilaurate, dioctyltin diacetate, dioctyltin di(2-ethylhexanoate), dibutyltin oxide, dibutyltin sulfide, dioctyltin oxide, dibutyltin fatty acid salts, lead 2-ethylhexanoate, zinc octylate, zinc naphthenate, zinc fatty acid salts, bismuth octanoate, bismuth 2-ethylhexanoate, bismuth oleate, bismuth neodecanoate, bismuth versatate, bismuth naphthenate, cobalt naphthenate, calcium octylate, copper naphthenate, and tetra(2-ethylhexyl)titanate; tertiary amine; and the like. These may be used singly, or in a combination of two or more.

When the paint composition of the present invention contains a urethanization reaction catalyst described above, the amount of the urethanization reaction catalyst is preferably within the range of 0.005 to 2 mass %, and more preferably 0.01 to 1 mass %, based on the total solids content in the paint composition of the present invention.

When the paint composition of the present invention contains a urethanization reaction catalyst described above, the paint composition of the present invention may contain acetic acid, propionic acid, butyric acid, isopentanoic acid, hexanoic acid, 2-ethylbutyric acid, naphthenic acid, octylic acid, nonanoic acid, decanoic acid, 2-ethylhexanoic acid, isooctanoic acid, isononanoic acid, lauric acid, palmitic acid, stearic acid, oleic acid, linoleic acid, neodecanoic acid, versatic acid, isobutyric anhydride, itaconic anhydride, acetic anhydride, citraconic anhydride, propionic anhydride, maleic anhydride, butyric anhydride, citric anhydride, trimellitic anhydride, pyromellitic anhydride, phthalic anhydride, or like organic acid; hydrochloric acid, phosphoric acid, or like inorganic acid; acetylacetone, an imidazole compound, or like metal coordination compound; or the like, from the viewpoint of storage stability, curability, or the like When a melamine resin described above is used as the crosslinking agent (A2) in the paint composition of the present invention, the paint composition of the present invention may contain, as a curing catalyst, p-toluenesulfonic acid, dodecylbenzenesulfonic acid, dinonylnaphthalene sulfonic acid, or like sulfonic acid; monobutyl phosphate, dibutyl phosphate, mono(2-ethylhexyl) phosphate, di(2-ethylhexyl) phosphate, or like alkyl phosphoric ester; a salt of such an acid with an amine compound; or the like.

When the paint composition of the present invention contains a curing catalyst for the melamine resin, it is preferred that the amount of the curing catalyst for the melamine resin is within the range of 0.1 to 2 mass %, preferably 0.2 to 1.7 mass %, and more preferably 0.3 to 1.4 mass %, based on the total solids content in the paint composition of the present invention.

The substrate to be coated with the paint composition of the present invention is not particularly limited. Examples of such substrates include exterior panel parts of automotive bodies such as for passenger cars, trucks, motorcycles, and buses; automotive components; exterior panel parts of household electric appliances such as cellular phones and audio equipment; and the like. The exterior panel parts of automotive bodies and automotive components are particularly preferable.

The material for the substrate is not particularly limited. Examples include metallic materials, such as iron, aluminum, brass, copper, tin plate, stainless steel, galvanized steel, steel plated with a zinc alloy (Zn—Al, Zn—Ni, Zn—Fe, or the like); plastic materials, such as polyethylene resins, polypropylene resins, acrylonitrile-butadiene-styrene (ABS) resins, polyamide resins, acrylic resins, vinylidene chloride resins, polycarbonate resins, polyurethane resins, epoxy resins, and like resins, and various types of FRP; inorganic materials, such as glass, cement, and concrete; wood; textile materials (e.g., paper and cloth); and the like. Of these materials, metallic materials and plastic materials are preferable.

The substrate may be a metallic material listed above or one formed from it, such as a vehicle body, which is subjected to a surface treatment, such as a phosphate treatment, chromate treatment, or composite oxide treatment. The substrate may also be a metallic material, vehicle body, or the like as described above, on which an undercoating film of various electrodeposition paint is formed, or on which an undercoating film of various electrodeposition paint is formed and an intermediate coating film is further formed on the undercoating film. The substrate may also be a plastic material, such as a bumper, on which a primer coating film is formed.

The method of applying a paint containing the paint composition of the present invention (hereinafter sometimes simply referred to as "the paint of the present invention") is not particularly limited. For example, air spray coating, airless spray coating, rotary atomization coating, curtain coating, or other coating methods can be used to form a wet coating film. In these coating methods, an electrostatic charge may be applied, if necessary. Of these methods, air spray coating or rotary atomization coating is particularly preferred. The paint of the present invention is generally preferably applied to a cured film thickness of about 10 to 60 µm, and more preferably 25 to 50 µm.

When air spray coating, airless spray coating, or rotary atomization coating is performed, it is preferable to appropriately adjust, by using a solvent, such as an organic solvent, the viscosity of the paint of the present invention in a viscosity range that is suitable for coating. The viscosity range is generally from 15 to 60 seconds, and preferably 20 to 40 seconds at 20° C., as measured with a Ford Cup No. 4 viscometer.

The wet coating film obtained by applying the paint of the present invention to a substance can be cured by heating. Heating can be performed by known heating means. For example, a drying furnace, such as a hot air furnace, an electric furnace, or an infrared induction heating furnace, can be used. The heating temperature is not particularly limited, and is, for example, preferably within the range of 60 to 160° C., and more preferably 80 to 140° C. The heating time is not particularly limited, and is, for example, preferably within the range of 10 to 60 minutes, and more preferably 15 to 30 minutes.

The paint of the present invention, which is a paint composition capable of forming a coating film that has excellent transparency, water resistance, and finished appearance, can be particularly suitably used as top clear coat paint. The paint of the present invention can be suitably used as paint for, in particular, automobiles.

Method for Forming Multilayer Coating Film

The method for forming a multilayer coating film in which the paint of the present invention is applied as top clear coat paint may, for example, comprise sequentially forming on a substrate at least one layer of colored base coat paint and at least one layer of clear coat paint, wherein the paint composition of the present invention is applied as clear coat paint for forming the uppermost layer.

Specific examples of such a method include a method for forming a multilayer coating film by a 2-coat 1-bake method, in which colored base coat paint is applied to a substrate onto which an electrodeposition coating film and/or intermediate coating film has been applied, the resulting uncured coating film is, as necessary, preheated at, for example, 40 to 90° C. for about 3 to 30 minutes to accelerate the vaporization of the solvent in the colored base coat paint, and the paint of the present invention is then applied as clear coat paint to the uncured colored base coating film, followed by simultaneous curing of the colored base coating film and the clear coating film.

The paint of the present invention can also be suitably used as top clear coat paint for top-coating in a 3-coat 2-bake method or a 3-coat 1-bake method.

The base coat paint used in the above manner may be a commonly known thermosetting base coat paint, and specific examples include paints obtained by combining a crosslinking agent, such as an amino resin, a polyisocyanate compound, or a blocked polyisocyanate compound, with reactive functional groups of a base resin, such as an acrylic resin, a polyester resin, an alkyd resin, or a urethane resin.

As the base coat paint, for example, aqueous paint, organic solvent-based paint, or powder paint can also be used. From the viewpoint of the finished appearance of the coating film and a reduction in the environmental load, aqueous paint is preferable.

When two or more clear coating films are formed in the method for forming a multilayer coating film, the paint of the present invention or known thermosetting clear coat paint may be used as clear coat paint for forming a layer other than the uppermost layer.

EXAMPLES

The present invention is described below in more detail with reference to Production Examples, Examples, and Comparative Examples. However, the present invention is not limited to these. In each example, "parts" and "%" are expressed on a mass basis unless otherwise specified, and the film thickness is the thickness of a cured coating film.

Production of Hydroxy-Containing Acrylic Resin (A1')

Production Example 1

27 parts of Swasol 1000 (trade name, produced by Cosmo Oil Co., Ltd., an aromatic-based organic solvent) and 5 parts of propylene glycol monomethyl ether acetate were placed in a reaction vessel equipped with a thermometer, a thermostat, a stirrer, a reflux condenser, a nitrogen inlet tube, and a dropping funnel and stirred at 150° C. while blowing nitrogen gas. A monomer mixture comprising 20 parts of styrene, 32.5 parts of 2-hydroxypropyl acrylate, 46.8 parts of isobutyl methacrylate, 0.7 parts of acrylic acid, and 6.0 parts of di-tertiary-amylperoxide (a polymerization initiator) was added thereto dropwise at a constant rate over a period of 4 hours. The resulting mixture was then aged at 150° C. for 1 hour, cooled, and further diluted with addition of 21 parts of isobutyl acetate, thereby obtaining a hydroxy-containing acrylic resin (A1'-1) solution having a solids concentration of 65 mass %. The obtained hydroxy-containing acrylic resin (A1'-1) had a hydroxy value of 139 mg KOH/g, an acid value of 5.5 mg KOH/g, a weight average molecular weight of 5,500, and a glass transition temperature of 38° C.

Production Example 2

27 parts of Swasol 1000 (trade name, produced by Cosmo Oil Co., Ltd., an aromatic-based organic solvent) and 5 parts of propylene glycol monomethyl ether acetate were placed in a reaction vessel equipped with a thermometer, a thermostat, a stirrer, a reflux condenser, a nitrogen inlet tube, and a dropping funnel and stirred at 150° C. while blowing nitrogen gas. A monomer mixture comprising 20 parts of styrene, 32.5 parts of 2-hydroxypropyl acrylate, 47.5 parts of isobutyl methacrylate, and 6.0 parts of di-tertiary-amylperoxide (a polymerization initiator) was added thereto dropwise at a constant rate over a period of 4 hours. The resulting mixture was then aged at 150° C. for 1 hour, cooled, and further diluted with addition of 21 parts of isobutyl acetate, thereby obtaining a hydroxy-containing acrylic resin (A1'-2) solution having a solids concentration of 65 mass %. The obtained hydroxy-containing acrylic resin (A1'-2) had a hydroxy value of 139 mg KOH/g, a weight average molecular weight of 5,500, and a glass transition temperature of 38° C.

Production of Rheology Control Agent (B)

Production Example 3

138.5 parts (solids content: 90 parts) of the hydroxy-containing acrylic resin (A1'-2) solution obtained in Production Example 2, 28.5 parts of Swasol 1000, and 10 parts of n-butanol were placed in a reaction vessel equipped with a stirrer and a dropping funnel. An amine mixture comprising 5.44 parts of benzylamine and 0.20 parts of JEFFAMINE D-400 (trade name, produced by Huntsman Corporation, a polyoxypropylene-containing diamine, number average molecular weight: 400) was added with stirring at room temperature. Subsequently, a mixture of 4.36 parts of hexamethylene diisocyanate and 13 parts of butyl acetate was added dropwise with stirring, thereby obtain a rheology control agent dispersion (BM-1). The obtained rheology control agent dispersion (BM-1) had a solids content of 50%. In the obtained rheology control agent dispersion (BM-1), the total mass of the components (b1) to (b3) was 10 parts by mass, the mass of the hydroxy-containing acrylic resin (A1'-2), which is a resin component, was 90 parts by mass, and the (total mass of components (b1) to (b3))/(mass of resin component) ratio was 10/90.

Production Examples 4 to 16

Rheology control agent dispersions (BM-2) to (BM-14) were obtained in the same manner as in Production Example 3, except that the formulations shown in Table 1 were used. The obtained rheology control agent dispersions (BM-2) to (BM-14) had a solids content of 50%. The amounts of the components shown in Table 1 are expressed as solids content by mass.

TABLE 1

| | Production Example | | | 3 | 4 | 5 | 6 | 7 |
|---|---|---|---|---|---|---|---|---|
| | Rheology control agent dispersion name | | | BM-1 | BM-2 | BM-3 | BM-4 | BM-5 |
| Resin component | Hydroxy-containing resin (A1) | Hydroxy-containing acrylic resin (A1') | Hydroxy-containing acrylic resin (A1'-2) | 90 | 90 | 90 | 90 | 90 |
| Rheology control agent (B) | Amine mixture | Primary monoamine having a number average molecular weight of 300 or less (b2) | Benzene ring-containing primary monoamine | Benzylamine | 5.44 | 5.28 | 5.08 | 5.10 | 4.97 |
| | | | | n-Hexylamine | | | | 0.2 | |
| | | | | n-Octylamine | | | | | 0.2 |
| | | Polyether amine having a number average molecular weight of more than 300 but less than 6000 (b3) | Polyoxyalkylene-containing diamine (b3-2) | JEFFAMINE D-400 | 0.2 | 0.4 | 0.4 | 0.4 | 0.8 |
| | | Polyisocyanate compound (b1) | Aliphatic polyisocyanate compound | Hexamethylene disocyanate | 4.36 | 4.32 | 4.32 | 4.30 | 4.23 |
| Proportion of each component based on the total mass of components (b1) to (b3) (mass %) | | | Polyisocyanate compound (b1) | | 43.6 | 43.2 | 43.2 | 43.0 | 42.3 |
| | | | Primary monoamine having a number average molecular weight of 300 or less (b2) | | 54.4 | 52.8 | 52.8 | 53.0 | 49.7 |
| | | | Polyether amine having a number average molecular weight of more than 300 but less than 6000 (b3) | | 2 | 4 | 4 | 4 | 8 |

TABLE 1-continued

| | | | | | | | | |
|---|---|---|---|---|---|---|---|---|
| Total mass of components (b1) to (b3) | | | | 10 | 10 | 10 | 10 | 10 |
| Mass of resin component | | | | 90 | 90 | 90 | 90 | 90 |
| (Total mass of components (b1) to (b3))/(mass of resin component) ratio | | | | 10/90 | 10/90 | 10/90 | 10/90 | 10/90 |

| | | | | Production Example | 8 | 9 | 10 | 11 | 12 |
|---|---|---|---|---|---|---|---|---|---|
| | | | | Rheology control agent dispersion name | BM-6 | BM-7 | BM-8 | BM-9 | BM-10 |
| Resin component | Hydroxy-containing resin (A1) | Hydroxy-containing acrylic resin (A1') | Hydroxy-containing acrylic resin (A1'-2) | | 90 | 190 | 90 | 90 | 90 |
| Rheology control agent (B) | Amine mixture | Primary monoamine having a number average molecular weight of 300 or less (b2) | Benzene ring-containing primary monoamine | Benzylamine | 5.34 | 5.34 | 5.36 | 5.37 | 5.28 |
| | | Polyether amine having a number average molecular weight of more than 300 but less than 6000 (b3) | Poly-oxyalkylene-containing diamine (b3-2) | ELASTAMINE RT-1000 (Note 1) | 0.4 | 0.4 | | | |
| | | | | JEFFAMINE D-2000 (Note 2) | | | 0.4 | | |
| | | | | JEFFAMINE D-4000 (Note 3) | | | | 0.4 | |
| | | | Poly-oxyalkylene-containing polyamine (b3-3) | JEFFAMINE T-5000 (Note 4) | | | | | 0.4 |
| | Polyisocyanate compound (b1) | Aliphatic polyisocyanate compound | Hexamethylene diisocyanate | | 4.26 | 4.26 | 4.24 | 4.23 | 4.32 |
| Proportion of each component based on the total mass of components (b1) to (b3) (mass %) | | Polyisocyanate compound (b1) | | | 42.6 | 42.6 | 42.4 | 42.3 | 43.2 |
| | | Primary monoamine having a number average molecular weight of 300 or less (b2) | | | 53.4 | 53.4 | 53.6 | 53.7 | 52.8 |
| | | Polyether amine having a number average molecular weight of more than 300 but less than 6000 (b3) | | | 4 | 4 | 4 | 4 | 4 |
| Total mass of components (b1) to (b3) | | | | | 10 | 10 | 10 | 10 | 10 |
| Mass of resin component | | | | | 90 | 190 | 90 | 90 | 90 |
| (Total mass of components (b1) to (b3))/(mass of resin component) ratio | | | | | 10/90 | 5/95 | 10/90 | 10/90 | 10/90 |

| | | | | Production Example | 13 | 14 | 15 | 16 |
|---|---|---|---|---|---|---|---|---|
| | | | | Rheology control agent dispersion name | BM-11 | BM-12 | BM-13 | BM-14 |
| Resin component | Hydroxy-containing resin (A1) | Hydroxy-containing acrylic resin (A1') | Hydroxy-containing acrylic resin (A1'-2) | | 90 | 90 | 90 | 90 |
| Rheology control agent (B) | Amine mixture | Primary monoamine having a number average molecular weight of 300 or less (b2) | Benzene ring-containing primary monoamine | Benzylamine | 5.35 | 5.36 | 5.60 | 5.21 |
| | | Polyether amine having a number average molecular weight of more than 300 but less than 6000 (b3) | Poly-oxyalkylene-containing monoamine (b3-1) | JEFFAMINE M-600 (Note 5) | 0.4 | | | |
| | | | | JEFFAMINE M-1000 (Note 6) | | 0.4 | | |
| | | | | JEFFAMINE D-230 (Note 7) | | | | 0.4 |

TABLE 1-continued

|  |  |  |  |  |  |  |
|---|---|---|---|---|---|---|
| Polyisocyanate compound (b1) | Aliphatic polyisocyanate compound | Hexamethylene diisocyanate | 4.25 | 4.24 | 4.4 | 4.39 |
| Proportion of each component based on the total mass of components (b1) to (b3) (mass %) | Polyisocyanate compound (b1) | | 42.5 | 42.4 | 44.0 | 43.9 |
| | Primary monoamine having a number average molecular weight of 300 or less (b2) | | 53.5 | 53.6 | 56.0 | 52.1 |
| | Polyether amine having a number average molecular weight of more than 300 but less than 6000 (b3) | | 4 | 4 | 0 | 0 |
| Total mass of components (b1) to (b3) | | | 10 | 10 | 10 | 10 |
| Mass of resin component | | | 90 | 90 | 90 | 90 |
| (Total mass of components (b1) to (b3))/(mass of resin component) ratio | | | 10/90 | 10/90 | 10/90 | 10/90 |

The notes in Table 1 mean the following.
Note 1: ELASTAMINE RT-1000: trade name, produced by Huntsman Corporation, polyoxyalkylene-containing diamine, a number average molecular weight of 1000
Note 2: JEFFAMINE D-2000: trade name, produced by Huntsman Corporation, polyoxyalkylene-containing diamine, a number average molecular weight of 2000
Note 3: JEFFAMINE D-4000: trade name, produced by Huntsman Corporation, polyoxyalkylene-containing diamine, a number average molecular weight of 4000
Note 4: JEFFAMINE T-5000: trade name, produced by Huntsman Corporation, polyoxyalkylene-containing triamine, a number average molecular weight of 5000
Note 5: JEFFAMINE M-600: trade name, produced by Huntsman Corporation, polyoxyalkylene-containing monoamine, a number average molecular weight of 600
Note 6: JEFFAMINE M-1000: trade name, produced by Huntsman Corporation, polyoxyalkylene-containing monoamine, a number average molecular weight of 1000
Note 7: JEFFAMINE D-230: trade name, produced by Huntsman Corporation, polyoxyalkylene-containing diamine, a number average molecular weight of 230
Production of Paint Composition
Production of Paint Composition No. 1

80 parts (solids content: 52 parts) of the hydroxy-containing acrylic resin (A1'-1) solution obtained in Production Example 1, 6.7 parts (solids content: 4 parts) of U-VAN 20SE60 (trade name, produced by Mitsui Chemicals, Inc., a melamine resin, solids content: 60%), 20 parts (solids content: 10 parts, in which the rheology control agent (B) component makes up 1 part, and the hydroxy-containing acrylic resin (A1'-2) makes up 9 parts) of the rheology control agent dispersion (BM-1) solution obtained in Production Example 3, and 0.4 parts (solids content: 0.2 parts) of BYK-300 (trade name, produced by BYK-Chemie, a surface-adjusting agent, active ingredient: 52%) were uniformly mixed to obtain a main agent. The main agent and 35 parts of Sumidur N3300 (trade name, produced by Sumika Covestro Urethane Co., Ltd., an isocyanurate of hexamethylene diisocyanate, solids content: 100%, which is a curing agent (crosslinking agent (A2)), were uniformly mixed just before application. Further, butyl acetate was added, and the mixture was adjusted so that the viscosity at 20° C. as measured with a Ford cup No. 4 was 30 seconds, thereby obtaining paint composition No. 1.
Production of Paint Compositions Nos. 2 to 5 and 8 to 29

Paint compositions Nos. 2 to 5 and 8 to 29 having a viscosity of 30 seconds as measured with a Ford cup No. 4 at 20° C. were obtained in the same manner as in paint composition No. 1, except that the formulations shown in Table 2 were used. The amounts of the components shown in Table 2 are expressed as solids content by mass.

Production of Paint Composition No. 6

93 parts (solids content: 60.5 parts) of the hydroxy-containing acrylic resin (A1'-1) solution obtained in Production Example 1, 58 parts (solids content: 35 parts) of U-VAN 20SE60, 10 parts (solids content: 5 parts, in which the rheology control agent (B) component makes up 0.5 parts, and the hydroxy-containing acrylic resin (A1'-2) makes up 4.5 parts) of the rheology control agent dispersion (BM-2) solution obtained in Production Example 4, and 0.4 parts (solids content: 0.2 parts) of BYK-300 were uniformly mixed. Further, butyl-acetate was added, and the mixture was adjusted so that the viscosity at 20° C. as measured with a Ford cup No. 4 was 30 seconds, thereby obtaining paint composition No. 6.

Production of Paint Composition No. 7

93 parts (solids content: 60.5 parts) of the hydroxy-containing acrylic resin (A1'-1) solution obtained in Production Example 1, 33 parts (solids content: 20 parts) of U-VAN 20SE60, 20 parts (solids content: 15 parts) of Desmodur PL 350 MPA/SN (trade name, produced by Sumika Covestro Urethane Co., Ltd., a blocked polyisocyanate compound, solids content: 75%), 10 parts (solids content: 5 parts, in which the rheology control agent (B) component makes up 0.5 parts, and the hydroxy-containing acrylic resin (A1'-2) makes up 4.5 parts) of the rheology control agent dispersion (BM-2) solution obtained in Production Example 4, and 0.4 parts (solids content: 0.2 parts) of BYK-300 were uniformly mixed. Further, butyl acetate was added, and the mixture was adjusted so that the viscosity at 20° C. as measured with a Ford cup No. 4 was 30 seconds, thereby obtaining paint composition No. 7.

Preparation of Test Panel

Preparation of Test Substrate

Electron GT-10 (trade name, produced by Kansai Paint Co., Ltd., cationic electrodeposition paint) was applied by electrodeposition to a cold-rolled steel plate treated with zinc phosphate to a dry film thickness of 20 μm and cured by heating at 170° C. for 30 minutes. Thereafter, WP-306T (trade name, produced by Kansai Paint Co., Ltd., polyester melamine resin-based aqueous intermediate paint) was electrostatically applied to the electrodeposition coating film by using a rotary atomization electrostatic coating machine to a cured film thickness of 30 μm and allowed to stand for 5 minutes. After preheating at 80° C. for 3 minutes and heating at 140° C. for 30 minutes, an intermediate coating film was formed, thereby preparing a test substrate.

Preparation of Test Panel

Production of Test Panels of Examples 1 to 27 and Comparative Examples 1 to 2

WBC-713T No. 202 (trade name, produced by Kansai Paint Co., Ltd., acrylic melamine resin-based aqueous base coat paint, coating color: black) was electrostatically applied to the test substrate held upright by using a rotary atomization electrostatic coating machine to a cured film thickness of 15 μm and allowed to stand for 5 minutes, followed by preheating at 80° C. for 3 minutes.

Subsequently, paint composition No. 1 was electrostatically applied to the uncured base coating film by using a rotary atomization electrostatic coating machine to a dry film thickness of 40 μm to form a clear coating film, allowed to stand for 7 minutes, and heated at 140° C. for 30 minutes (keeping time) to cure the base coating film and the clear coating film, thereby preparing a test panel of Example 1.

Test panels of Examples 2 to 27 and Comparative Examples 1 to 2 were prepared in the same manner as in the preparation of the test panel of paint composition No. 1, except paint compositions No. 2 to 29 were each used instead of paint composition No. 1.

The test panels obtained in the above examples were each evaluated by the test methods described below. Table 2 also shows the evaluation results together with the formulations of the paint compositions.

Test Method

Transparency: The transparency of each test panel was evaluated based on an L* value measured with a CM-512m3 (trade name, produced by Konica Minolta, Inc., a multi-angle spectrophotometer). In this test, the L* value was a value obtained by summing the L* values obtained when the panel was illuminated with standard illuminant D65 from three angles, i.e., 25° (highlight direction), 45°, and 75° (bottom direction) relative to the receiving angle (the direction perpendicular to the coated surface was regarded as 0°). The smaller the L* value, the clearer the black color of the base coating film of the lower layer, and the higher the transparency of the clear coating film formed.

Water resistance: After the L* value of each test panel was measured, the test panel was immersed in warm water at 40° C. for 10 days, and the L* value of the test panel after immersion was measured. Then, the difference ΔL* between the L* value before immersion and the L* value after immersion was calculated. The smaller the ΔL*, the less the blushing of the coating film due to warm water immersion, and the higher the water resistance.

Finished appearance: The finished appearance of each test panel was evaluated based on a long wave (LW) value measured by using Wave Scan (trade name, produced by BYK Gardner). The smaller the LW value, the higher the smoothness of the coating surface.

TABLE 2

| | | | | | | | Example | | | | | |
|---|---|---|---|---|---|---|---|---|---|---|---|---|
| | | | | | | 1 | 2 | 3 | 4 | 5 | 6 | 7 |
| | | Paint composition No. | | | | 1 | 2 | 3 | 4 | 5 | 6 | 7 |
| Main agent | Binder component (A) | Hydroxy-containing resin (A1) | Hydroxy-containing acrylic resin (A1') | Hydroxy-containing acrylic resin (A1'-1) | | 52 | 56.5 | 52 | 47.5 | 60.5 | 60.5 | 60.5 |
| | | Crosslinking agent (A2) | Amino resin | U-VAN 20SE60 | | 4 | 4 | 4 | 4 | | 35 | 20 |
| | | | Blocked polyisocyanate compound | Desmodur PL 350 MPA/SN | | | | | | | | 15 |
| | | Rheology control agent dispersion | | Name | | BM-1 | BM-2 | BM-2 | BM-2 | BM-2 | BM-2 | BM-2 |
| | | | | Amount | | 10 | 5 | 10 | 15 | 5 | 5 | 5 |
| | | Surface-adjusting agent | | BYK-300 | | 0.2 | 0.2 | 0.2 | 0.2 | 0.2 | 0.2 | 0.2 |
| Curing agent | Binder component (A) | Crosslinking agent (A2) | Polyisocyanate compound | Sumidur N3300 | | 35 | 35 | 35 | 35 | 35 | | |
| Content of components (A) and (B) (parts by mass) | Binder component (A) | Hydroxy-containing resin (A1) | | | | 61 | 61 | 61 | 61 | 65 | 65 | 65 |
| | | Crosslinking agent (A2) | | | | 39 | 39 | 39 | 39 | 35 | 35 | 35 |
| | Rheology control agent (B) | | | | | 1.0 | 0.5 | 1.0 | 1.5 | 0.5 | 0.5 | 0.5 |
| Evaluation results | Transparency (L*) | | | | | 1.5 | 1.2 | 1.3 | 1.7 | 1.8 | 1.0 | 1.0 |
| | Water resistance (ΔL*) | | | | | 0.7 | 0.5 | 0.6 | 0.8 | 1.0 | 0.5 | 0.6 |
| | Finished appearance (LW) | | | | | 11.2 | 12.1 | 10.3 | 10.2 | 11.3 | 13.1 | 12.1 |

| | | | | | | Example | | | | | |
|---|---|---|---|---|---|---|---|---|---|---|---|
| | | | | | | 8 | 9 | 10 | 11 | 12 | 13 |
| | | Paint composition No. | | | | 8 | 9 | 10 | 11 | 12 | 13 |
| Main agent | Binder component (A) | Hydroxy-containing resin (A1) | Hydroxy-containing acrylic resin (A1') | Hydroxy-containing acrylic resin (A1'-1) | | 52 | 52 | 56.5 | 56.5 | 52 | 47.5 |
| | | Crosslinking agent (A2) | Amino resin | U-VAN 20SE60 | | 4 | 4 | 4 | 4 | 4 | 4 |
| | | Rheology control agent dispersion | | Name | | BM-3 | BM-4 | BM-5 | BM-6 | BM-6 | BM-6 |
| | | | | Amount | | 10 | 10 | 10 | 5 | 10 | 15 |
| | | Surface-adjusting agent | | BYK-300 | | 0.2 | 0.2 | 0.2 | 0.2 | 0.2 | 0.2 |

TABLE 2-continued

| Curing agent | Binder component (A) | Crosslinking agent (A2) | Poly-isocyanate compound | Sumidur N3300 | 35 | 35 | 35 | 35 | 35 | 35 |
|---|---|---|---|---|---|---|---|---|---|---|
| Content of components (A) and (B) (parts by mass) | Binder component (A) | Hydroxy-containing resin (A1) | | | 61 | 61 | 61 | 61 | 61 | 61 |
| | | Crosslinking agent (A2) | | | 39 | 39 | 39 | 39 | 39 | 39 |
| | Rheology control agent (B) | | | | 1.0 | 1.0 | 1.0 | 0.5 | 1.0 | 1.5 |
| Evaluation results | Transparency (L*) | | | | 1.2 | 1.2 | 1.1 | 1.2 | 1.4 | 1.7 |
| | Water resistance (ΔL*) | | | | 0.5 | 0.6 | 0.5 | 0.5 | 0.6 | 0.8 |
| | Finished appearance (LW) | | | | 10.7 | 10.9 | 11.8 | 10.1 | 9.8 | 9.7 |

| | | | | | Example | | | | | |
|---|---|---|---|---|---|---|---|---|---|---|
| | | | | | 14 | 15 | 16 | 17 | 18 | 19 |
| Paint composition No. | | | | | 14 | 15 | 16 | 17 | 18 | 19 |
| Main agent | Binder component (A) | Hydroxy-containing resin (A1) | Hydroxy-containing acrylic resin (A1') | Hydroxy-containing acrylic resin (A1'-1) | 42 | 52 | 52 | 52 | 52 | 52 |
| | | Crosslinking agent (A2) | Amino resin | U-VAN 20SE60 | 4 | 4 | 4 | 4 | 4 | 4 |
| | Rheology control agent dispersion | | Name | | BM-7 | BM-8 | BM-9 | BM-10 | BM-11 | BM-12 |
| | | | Amount | | 20 | 10 | 10 | 10 | 10 | 10 |
| | Surface-adjusting agent | | | BYK-300 | 0.2 | 0.2 | 0.2 | 0.2 | 0.2 | 0.2 |
| Curing agent | Binder component (A) | Crosslinking agent (A2) | Poly-isocyanate compound | Sumidur N3300 | 35 | 35 | 35 | 35 | 35 | 35 |
| Content of components (A) and (B) (parts by mass) | Binder component (A) | Hydroxy-containing resin (A1) | | | 61 | 61 | 61 | 61 | 61 | 61 |
| | | Crosslinking agent (A2) | | | 39 | 39 | 39 | 39 | 39 | 39 |
| | Rheology control agent (B) | | | | 1.0 | 1.0 | 1.0 | 1.0 | 1.0 | 1.0 |
| Evaluation results | Transparency (L*) | | | | 1.4 | 1.5 | 1.6 | 1.6 | 1.7 | 1.8 |
| | Water resistance (ΔL*) | | | | 0.6 | 0.7 | 0.8 | 0.9 | 1.0 | 1.1 |
| | Finished appearance (LW) | | | | 9.9 | 10.5 | 11.2 | 11.5 | 14.8 | 14.2 |

| | | | | | Example | | | | | |
|---|---|---|---|---|---|---|---|---|---|---|
| | | | | | 20 | 21 | 22 | 23 | 24 | 25 |
| Paint composition No. | | | | | 20 | 21 | 22 | 23 | 24 | 25 |
| Main agent | Binder component (A) | Hydroxy-containing resin (A1) | Hydroxy-containing acrylic resin (A1') | Hydroxy-containing acrylic resin (A1'-1) | 52 | 52 | 52 | 52 | 52 | 52 |
| | | Crosslinking agent (A2) | Amino resin | U-VAN 20SE60 | 4 | 4 | 4 | 4 | 4 | |
| | | | | Cymel 350 (Note 8) | | | | | | 4 |
| | Rheology control agent dispersion | | Name | | BM-2 | BM-2 | BM-2 | BM-2 | BM-2 | BM-2 |
| | | | Amount | | 10 | 10 | 10 | 10 | 10 | 10 |
| | Surface-adjusting agent | | | BYK-300 | 0.2 | 0.2 | 0.2 | 0.2 | 0.2 | 0.2 |
| | Ultraviolet absorber | | | TINUVIN 400 (Note 10) | 3 | 3 | 3 | 3 | 3 | 3 |
| | Light stabilizer | | | HOSTAVIN 3058 (Note 11) | 1 | 1 | 1 | 1 | 1 | 1 |
| Catalyst | Urethanization reaction catalyst | | | NEOSTANN U-100 (Note 12) | | 0.1 | 0.1 | 0.1 | | |
| | Curing catalyst for melamine resin | | | NACURE 5523 (Note 13) | | | | | 0.1 | 0.1 |
| | | | | NACURE 4167 (Note 14) | | | | | | |
| Curing agent | Binder component (A) | Crosslinking agent (A2) | Poly-isocyanate compound | Sumidur N3300 | 35 | 35 | 25 | 25 | 35 | 35 |
| | | | | Desmodur XP2679 (Note 15) | | | 10 | | | |
| | | | | Sumidur N3400 (Note 16) | | | | 10 | | |

TABLE 2-continued

| Content of components (A) and (B) (parts by mass) | Binder component (A) | Hydroxy-containing resin (A1) | 61 | 61 | 61 | 61 | 61 | 61 |
|---|---|---|---|---|---|---|---|---|
| | | Crosslinking agent (A2) | 39 | 39 | 39 | 39 | 39 | 39 |
| | | Rheology control agent (B) | 1.0 | 1.0 | 1.0 | 1.0 | 1.0 | 1.0 |
| Evaluation results | | Transparency (L*) | 1.3 | 1.5 | 1.6 | 1.4 | 1.2 | 1.1 |
| | | Water resistance (ΔL*) | 0.6 | 0.7 | 0.8 | 0.7 | 0.6 | 0.5 |
| | | Finished appearance (LW) | 10.3 | 10.1 | 10.1 | 10.0 | 10.2 | 10.1 |

| | | | | | Example | | Comparative Example | |
|---|---|---|---|---|---|---|---|---|
| | | | | | 26 | 27 | 1 | 2 |
| Paint composition No. | | | | | 26 | 27 | 28 | 29 |
| Main agent | Binder component (A) | Hydroxy-containing resin (A1) | Hydroxy-containing acrylic resin (A1') | Hydroxy-containing acrylic resin (A1'-1) | 52 | 52 | 52 | 52 |
| | | Crosslinking agent (A2) | Amino resin | U-VAN 20SE60 | | 4 | 4 | 4 |
| | | | | Cymel 202 (Note 9) | 4 | | | |
| | Rheology control agent dispersion | | | Name | BM-2 | BM-2 | BM-13 | BM-14 |
| | | | | Amount | 10 | 10 | 10 | 10 |
| | Surface-adjusting agent | | | BYK-300 | 0.2 | 0.2 | 0.2 | 0.2 |
| | Ultraviolet absorber | | | TINUVIN 400 (Note 10) | 3 | 3 | | |
| | Light stabilizer | | | HOSTAVIN 3058 (Note 11) | 1 | 1 | | |
| Catalyst | Curing catalyst for melamine resin | | | NACURE 5523 (Note 13) | 0.1 | | | |
| | | | | NACURE 4167 (Note 14) | | 0.1 | | |
| Curing agent | Binder component (A) | Crosslinking agent (A2) | Polyisocyanate compound | Sumidur N3300 | 35 | 35 | 35 | 35 |
| Content of components (A) and (B) (parts by mass) | Binder component (A) | Hydroxy-containing resin (A1) | | | 61 | 61 | 61 | 61 |
| | | Crosslinking agent (A2) | | | 39 | 39 | 39 | 39 |
| | | Rheology control agent (B) | | | 1.0 | 1.0 | 1.0 | 1.0 |
| Evaluation results | | Transparency (L*) | | | 1.1 | 1.2 | 7.5 | 1.5 |
| | | Water resistance (ΔL*) | | | 0.5 | 0.5 | 5.2 | 0.6 |
| | | Finished appearance (LW) | | | 10.2 | 9.9 | 14.0 | 18.0 |

The notes in Table 2 mean the following.
Note 8:
Cymel 350: trade name, produced by Allnex Japan Inc., melamine resin, solids content: 100%
Note 9:
Cymel 202: trade name, produced by Allnex Japan Inc., melamine resin, solids content: 80%
Note 10:
TINUVIN 400: trade name, produced by BASF, benzotriazole ultraviolet absorber, active ingredient: 100%
Note 11:
HOSTAVIN 3058: trade name, produced by Clariant, hindered amine light stabilizer, acylated hindered amine, active ingredient: 100%
Note 12:
NEOSTANN U-100: trade name, produced by Nitto Kasei Co., Ltd., urethanization reaction catalyst, active ingredient: 100%
Note 13:
NACURE 5523: trade name, produced by King Industries, Inc., amine salt of dodecylbenzenesulfonic acid, curing catalyst for melamine resin, active ingredient: 35%
Note 14:
NACURE 4167: trade name, produced by King Industries, Inc., triethylamine salt of alkylphosphoric acid, curing catalyst for melamine resin, active ingredient: 25%
Note 15:
Desmodur XP2679: trade name, allophanate of hexamethylene diisocyanate, produced by Sumika Covest.ro Urethane Co., Ltd., solids content: 80%
Note 16:
Sumidur N3400: trade name, produced by Sumika Covestro Urethane Co., Ltd., uretdione of hexamethylene diisocyanate, solids content: 100%

The embodiments and Examples of the present invention are described in detail above. However, the present invention is not limited to these embodiments, and various modifications can be made based on the technical idea of the present invention.

For instance, the structures, methods, steps, shapes, materials, and values stated in the embodiments and Examples above are merely examples, and different structures, methods, steps, shapes, materials, values, and the like may also be used as necessary.

Additionally, the structures, methods, steps, shapes, materials, values, and the like stated in the embodiments may be interchangeably combined without departing from the spirit and principal concepts of the present invention.

Furthermore, the present invention can also use the following structures.

(1) A paint composition comprising (A) a binder component and (B) a rheology control agent, the rheology control agent (B) comprising a reaction product of (b1) a polyisocyanate compound, (b2) a primary monoamine having a number average molecular weight of 300 or less, and (b3) a polyether amine having a number average molecular weight of more than 300 but less than 6000.

(2) The paint composition according to (1), wherein the binder component (A) comprises a hydroxy-containing resin (A1) and a crosslinking agent (A2).

(3) The paint composition according to (2), wherein the crosslinking agent (A2) comprises at least one member selected from the group consisting of amino resins, polyisocyanate compounds, and blocked polyisocyanate compounds.

(4) The paint composition according to (2) or (3), wherein the crosslinking agent (A2) comprises an amino resin.

(5) The paint composition according to (2) or (3), wherein the crosslinking agent (A2) comprises a polyisocyanate compound.

(6) The paint composition according to any one of (2) to (5), wherein the hydroxy-containing resin (A1) is at least one member selected from the group consisting of hydroxy-containing acrylic resins, hydroxy-containing polyester resins, hydroxy-containing acrylic-modified polyester resins, hydroxy-containing polyether resins, hydroxy-containing polycarbonate resins, hydroxy-containing polyurethane resins, hydroxy-containing epoxy resins, and hydroxy-containing alkyd resins.

(7) The paint composition according to any one of (2) to (6), wherein the hydroxy-containing resin (A1) is a hydroxy-containing acrylic resin.

(8) The paint composition according to any one of (1) to (7), wherein the primary monoamine having a number average molecular weight of 300 or less (b2) comprises a benzene ring-containing primary monoamine.

(9) The paint composition according to (8), wherein the primary monoamine having a number average molecular weight of 300 or less (b2) comprises benzylamine.

(10) The paint composition according to any one of (1) to (9), wherein the polyether amine having a number average molecular weight of more than 300 but less than 6000 (b3) is at least one amine selected from the group consisting of monoamines, diamines, and triamines.

(11) The paint composition according to any one of (1) to (9), wherein the polyether amine having a number average molecular weight of more than 300 but less than 6000 (b3) is at least one amine compound selected from the group consisting of polyoxyalkylene-containing monoamines represented by formula (1), polyoxyalkylene-containing diamines represented by formula (3), and polyoxyalkylene-containing polyamines having three or more amino groups represented by formula (6).

(12) The paint composition according to any one of (1) to (9), wherein the polyether amine having a number average molecular weight of more than 300 but less than 6000 (b3) is a diamine.

(13) The paint composition according to any one of (1) to (12), wherein the proportions of the polyisocyanate compound (b1), the primary monoamine having a number average molecular weight of 300 or less (b2), and the polyether amine having a number average molecular weight of more than 300 but less than 6000 (b3) in the rheology control agent (B) are such that based on the total amount of the components (b1) to (b3), the amount of the polyisocyanate compound (b1) is within the range of 30 to 60 mass %, the amount of the primary monoamine having a number average molecular weight of 300 or less (b2) is within the range of 35 to 65 mass %, and the amount of the polyether amine having a number average molecular weight of more than 300 but less than 6000 (b3) is within the range of 0.5 to 15 mass %.

(14) The paint composition according to any one of (5) to (13), wherein the proportion of the polyisocyanate compound is 5 to 60 parts by mass based on 100 parts by mass of the total solids content of the hydroxy-containing resin (A1) and the crosslinking agent (A2).

(15) The paint composition according to any one of (1) to (14), wherein the content of the rheology control agent (B) is within the range of 0.1 to 3 parts by mass based on 100 parts by mass of the total solids content of the binder component (A).

The invention claimed is:

1. A paint composition comprising (A) a binder component and (B) a rheology control agent, the rheology control agent (B) comprising a reaction product of (b1) a polyisocyanate compound, (b2) a primary monoamine having a number average molecular weight of 300 or less, and (b3) a polyether amine having a number average molecular weight of more than 300 but less than 6000, (b1) the polyisocyanate compound including an aliphatic polyisocyanate compound, an alicyclic polyisocyanate compound, an aromatic-aliphatic polyisocyanate compound, an aromatic polyisocyanate compound, or a derivative of said polyisocyanate compounds, the derivative of said polyisocyanate compounds including a dimer, a trimer, a biuret, an allophanate, an uretidione, an urethimine, an isocyanurate or an oxadiazinetrione thereof.

2. The paint composition according to claim 1, wherein the binder component (A) comprises a hydroxy-containing resin (A1) and a crosslinking agent (A2).

3. The paint composition according to claim 2, wherein the crosslinking agent (A2) comprises at least one member selected from the group consisting of amino resins, polyisocyanate compounds, and blocked polyisocyanate compounds.

4. The paint composition according to claim 2, wherein the crosslinking agent (A2) comprises a polyisocyanate compound.

5. The paint composition according to claim 1, wherein the primary monoamine having a number average molecular weight of 300 or less (b2) comprises a benzene ring-containing primary monoamine.

6. The paint composition according to claim 1, wherein the polyether amine having a number average molecular weight of more than 300 but less than 6000 (b3) is a diamine.

7. The paint composition according to claim 1, wherein the proportions of the polyisocyanate compound (b1), the primary monoamine having a number average molecular weight of 300 or less (b2), and the polyether amine having a number average molecular weight of more than 300 but less than 6000 (b3) in the rheology control agent (B) are such that based on the total amount of the components (b1) to (b3), the amount of the polyisocyanate compound (b1) is within the range of 30 to 60 mass %, the amount of the primary monoamine having a number average molecular weight of 300 or less (b2) is within the range of 35 to 65 mass %, and the amount of the polyether amine having a number average molecular weight of more than 300 but less than 6000 (b3) is within the range of 0.5 to 15 mass %.

8. The paint composition according to claim 1, wherein the content of the rheology control agent (B) is within the range of 0.1 to 3 parts by mass based on 100 parts by mass of the total solids content of the binder component (A).

9. The paint composition according to claim 2, wherein the crosslinking agent (A2) comprises an aliphatic diisocyanate compound and/or an isocyanurate thereof.

10. The paint composition according to claim 2, wherein the crosslinking agent (A2) comprises hexamethylene diisocyanate and/or an isocyanurate thereof.

* * * * *